US010848519B2

(12) United States Patent
Howard et al.

(10) Patent No.: US 10,848,519 B2
(45) Date of Patent: Nov. 24, 2020

(54) CYBER VACCINE AND PREDICTIVE-MALWARE-DEFENSE METHODS AND SYSTEMS

(71) Applicant: Charles River Analytics, Inc., Cambridge, MA (US)

(72) Inventors: Michael Howard, Watertown, MA (US); Avi Pfeffer, Cambridge, MA (US); Mukesh Dalal, Carlisle, MA (US); Michael Reposa, Lynn, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 197 days.

(21) Appl. No.: 16/159,067

(22) Filed: Oct. 12, 2018

(65) Prior Publication Data

US 2019/0199736 A1 Jun. 27, 2019

Related U.S. Application Data

(60) Provisional application No. 62/571,469, filed on Oct. 12, 2017.

(51) Int. Cl.
*H04L 29/06* (2006.01)
*G06F 21/55* (2013.01)
(Continued)

(52) U.S. Cl.
CPC .......... *H04L 63/145* (2013.01); *G06F 21/552* (2013.01); *G06F 21/554* (2013.01);
(Continued)

(58) Field of Classification Search
CPC . H04L 63/145; H04L 9/3247; H04L 63/1416; H04L 63/1425; G06F 21/554;
(Continued)

(56) References Cited

U.S. PATENT DOCUMENTS

2011/0320816 A1* 12/2011 Yao ....................... G06F 21/316
713/171
2014/0090061 A1* 3/2014 Avasarala ............... G06F 21/56
726/24

(Continued)

OTHER PUBLICATIONS

Pfeffer, A., et al., "Malware analysis and attribution using genetic information," presented at the Malicious and Unwanted Software (MALWARE), 2012 7th International Conference on, 2012, pp. 39-45.

(Continued)

*Primary Examiner* — Khoi V Le
(74) *Attorney, Agent, or Firm* — Cesari and McKenna, LLP

(57) ABSTRACT

Methods and systems for Predictive Malware Defense (PMD) are described. The systems and methods can utilize advanced machine-learning (ML) techniques to generate malware defenses preemptively. Embodiments of PMD can utilize models, which are trained on features extracted from malware families, to predict possible courses of malware evolution. PMD captures these predicted future evolutions in signatures of as yet unseen malware variants to function as a malware vaccine. These signatures of predicted future malware "evolutions" can be added to the training set of a machine-learning (ML) based malware detection and/or mitigation system so that it can detect these new variants as they arrive.

7 Claims, 6 Drawing Sheets

(51) Int. Cl.
    *G06F 21/57* (2013.01)
    *H04L 9/32* (2006.01)
    *G06N 20/00* (2019.01)
    *G06F 21/56* (2013.01)
    *G06N 20/10* (2019.01)

(52) U.S. Cl.
    CPC ............ *G06F 21/566* (2013.01); *G06F 21/57* (2013.01); *G06N 20/00* (2019.01); *G06N 20/10* (2019.01); *H04L 9/3247* (2013.01); *H04L 63/1416* (2013.01); *H04L 63/1425* (2013.01)

(58) Field of Classification Search
    CPC ...... G06F 21/57; G06F 21/552; G06F 21/566; G06N 20/00; G06N 20/10; G06N 5/003; G06N 7/005; G06N 3/0454; G06N 3/084; G06N 3/126
    See application file for complete search history.

(56) References Cited

U.S. PATENT DOCUMENTS

| | | |
|---|---|---|
| 2015/0125263 A1 | 5/2015 | Grabowska |
| 2015/0128263 A1 | 5/2015 | Raugas et al. |
| 2015/0163242 A1 | 6/2015 | Laidlaw et al. |
| 2015/0163424 A1 | 6/2015 | Morino et al. |
| 2017/0032279 A1* | 2/2017 | Miserendino ..... H04W 12/1208 |
| 2017/0214702 A1* | 7/2017 | Moscovici ........ H04W 12/1202 |
| 2017/0230401 A1* | 8/2017 | Ahmed .................... G06N 3/08 |
| 2017/0250954 A1* | 8/2017 | Jain ..................... H04L 63/1416 |
| 2017/0279834 A1* | 9/2017 | Vasseur ................. G06N 20/00 |

OTHER PUBLICATIONS

Pfeffer, A., "Practical Probabilistic Programming," Manning Publications Co. Greenwich, CT, USA 2016.

Lakhotia, A., et al., "Fast location of similar code fragments using semantic 'juice,'" SIGPLAN Program Protection and Reverse Engineering Workshop, p. 5. ACM, 2013.

International Search Report and Written Opinion dated Dec. 11, 2018 for International Application No. PCT/US2018/055625 filed Oct. 12, 2018 for Charles River Analytics, Inc., 12 pages.

Pfeffer, A., "Figaro: An object-oriented probabilistic programming language," Charles River Analytics Technical Report, 2009.

International Preliminary Report on Patentability dated Apr. 14, 2020 for International Application No. PCT/US2018/055625 filed Oct. 12, 2018, 6 pages.

* cited by examiner

| 401290: b8 05 00 00 00    mov eax,0x5 | eax = 5 | A = N1                                      900 |
| 401295: 81 c3 04 00 00 00 add ebx,0x4 | ebx = (def(ebx) + 4) x 5 | B = def(B) x N1 + N2 |
| 40129b: 6b c3             imul eax,ebx | = def(ebx) x 5 + 20 | where N2 = N1 x N3 |
|  |  | and type(A) = type(B) = reg32 |
| (a) Code | (b) Semantics | (c) Juice |

FIG. 9

| eax = 5 | ebx = 10 | R1 = N1 | 1000 |
| ebx = 10 | ecx = 5 | R2 = N2 | R = N |
| mem(def(eax)) = def(ebx) | mem(def(ebx)) = def(ecx) | mem(def(R1)) = def(R2) | mem(def(R)) = def(R) |
| mem(def(ebx)) = def(eax) | mem(def(ecx)) = def(ebx) | mem(def(R2)) = def(R1) |  |
| (a) Semantics 1 | (b) Semantics 2 | (c) Juice | (d) Abstracted Juice |

FIG. 10

| push(ebp) |  |  | 1100 |
| mov(ebp,esp) |  |  |  |
| sub(esp,16) |  |  |  |
| mov(eax,dptr(ebp)) |  |  |  |
| push(edi) |  |  |  |
| push(ebx) |  |  |  |
| mov(ebx,ebp) |  |  |  |
| mov(edi,ebx) |  | eax = -20 + def (esp) | A = -N1 + def(B) |
| pop(ebx) |  | ebp = -4 + def (esp) | C = -N2 + def(B) |
| push(ebx) |  | esp = -24 + def(esp) | B = -N3 + def(B) |
| mov(ebx,46) | push(ebp) | memdw(-24 + def(esp)) = -20 + def(esp) | memdw(-N3 + def(B)) = -N1 + def(B) |
| sub(edi,ebx) | mov(ebp,esp) | memdw(-20 + def(esp)) = 1634038339 | memdw(-N1 + def(B)) = N4 |
| pop(ebx) | sub(esp,16) | memdw(-16 + def(esp)) = 1766221172 | memdw(-N5 + def(B)) = N6 |
| mov(dptr(edi+42),eax) | mov(eax,dptr(ebp)) | memdw(-12 + def(esp)) = 4285804 | memdw(-N7 + def(B)) = N8 |
| pop(edi) | mov(dptr(ebp-4),eax) | memdw(-8 + def(esp)) = def(ebp) | memdw(-N9 + def(B)) = def(C) |
| lea(eax,wptr(ebp-16)) | mov(dptr(ebt-4),eax) | memdw(-4 + def(esp)) = def(ebp) | memdw(-N2 + def(B)) = def(C) |
| push(esi) | lea(eax,wptr(ebp-16)) |  | where |
| mov(esi,1634038339) | mov(dptr(eax),1634038339) | Simplifications performed | N6 = N10 + N11 |
| mov(dptr(eax),esi) | mov(dptr(eax+4),1766221172) | 1766221172 = 32509012 + 1733712160 | -N12 = -N2 - N13 |
| pop(esi) | mov(dptr(eax+8),4285804) | -50 = -4 - 46 | -N1 = -N2 - N5 |
| push(esi) | push(eax) | -20 = -4 - 16 | -N5 = -N1 + N2 |
| mov(esi,32509012) |  | -16 = -20 + 4 | -N7 = -N1 + N9 |
| add(esi,1733712160) |  | -12 = -20 + 8 | -N9 = -N12 + N14 |
| mov(dptr(eax+4),esi) |  | -8 = -50 + 42 |  |
| pop(esi) |  |  |  |
| push(edx) |  |  |  |
| mov(edx,4285804) |  |  |  |
| mov(dptr(eax+8),edx) |  |  |  |
| pop(edx) |  |  |  |
| push(eax) |  |  |  |
| (a) Variant 1 | (b) Variant 2 | (c) Semantics | (d) Juice |

FIG. 11

CYBER VACCINE AND PREDICTIVE-MALWARE-DEFENSE METHODS AND SYSTEMS

CROSS-REFERENCE TO RELATED APPLICATION

This application is based upon and claims priority to U.S. provisional patent application 62/571,469, entitled "Cyber Vaccine," filed Oct. 12, 2017, the entire content of this noted provisional application is incorporated herein by reference.

STATEMENT REGARDING FEDERALLY SPONSORED RESEARCH

This invention was made with government support under Grant No. PMD C15186 and HHSP233201600011C awarded by U.S. Department of Health and Human Services. The government has certain rights in the invention.

BACKGROUND

Technical Field

This disclosure relates to anti-malware and to systems and methods of combating cyber-attacks and malware.

Description of Related Art

One of the challenges of cyber-attack and malware defense is that the attacker has the advantage over the defender. In many cases, an attack is successful and causes damage before the defender can even begin to prepare a defense.

Cyber-attacks, and in particular malware attacks, have proven to typically be extremely costly to commercial and government entities. The amount and complexity of malicious cyber activity continues to grow and the problem only becomes more serious with malware targeting mobile devices and the Internet of Things. In addition, attacks increase in sophistication as malware authors continually develop malware that circumvents standard signature-based antivirus (AV) defense systems. Existing methods for defense against malware attacks are usually reactive. In a typical malware-attack scenario, the attacker exploits an existing vulnerability and inflicts potentially significant damage before the defender can respond. With this first-mover advantage, the attacker has the initiative, and the defender is continually trying to catch up. Much novel malware evades AV defenses and signatures have to be developed after detection, resulting in a delayed capability to defend.

Machine learning (ML) methods have shown the ability to detect more malware than typical signature-based methods. ML-based malware detection systems can be considered to be preemptive to some extent, as they are able to detect malware variants they have not seen before. However, the models used to detect these variants are based only on the existing malware and do not model the ways malware might change and evolve.

To date, research efforts aimed at automatic prediction of future trends in malware are relatively scarce. In general, most publications about malware forecasts are broad and high level, and based on the empirical insights of expert analysts. Machine learning in general has been applied to a variety of tasks related to malware analysis. These efforts, however, have typically focused on identifying a single characteristic of a single malware sample.

SUMMARY

The present disclosure is generally directed to and provides systems and methods for combating cyberattacks. General aspects of the present disclosure can be applied to any kind of attack that can be represented by features and in which families of attacks develop over time. Examples include, but are not limited to, malware attacks and network-based attacks.

One aspect of the present disclosure is directed to and provides methods and systems for Predictive Malware Defense (PMD). The systems and methods can utilize advanced machine-learning (ML) techniques to generate malware defenses preemptively. Embodiments of PMD can utilize models, which are trained on features extracted from malware families, to predict possible courses of malware evolution. PMD captures these predicted future evolutions in signatures of as yet unseen malware variants to function as a malware vaccine. These signatures of predicted future malware "evolutions" can be added to the training set of a machine-learning (ML) based malware detection and/or mitigation system so that it can detect these new variants as they arrive.

An exemplary embodiment of the present disclosure provides a system for predictive malware defense, the system including: a processor; a memory in communication with the processor via a communication infrastructure (e.g., conductive paths, optical waveguides, or wireless communication channel(s)) and storing instructions that, when executed by the processor, cause the processor to: perform feature reduction training on a collection of events including benign and malicious events, producing a feature reducer; perform evolution pattern training, wherein a collection of malicious events has features extracted which are converted into signatures by the feature reducer, and wherein a family clusterer produces a collection of families from the signatures, producing an evolution pattern predictor operative to predict future signatures in a family; perform evolution pattern prediction, wherein a collection of malicious events has its features extracted, which are converted into signatures by the feature reducer, wherein the family clusterer produces a collection of families from the signatures, and wherein the evolution pattern predictor operates on the collection of families to produce future malicious event signatures; perform malicious event detection training, wherein a collection of benign and malicious events, with known labels, has its features extracted, which are converted into signatures by the feature reducer, wherein the signatures are combined with the future malicious event signatures, creating a training collection for an event classification trainer, wherein the event classification trainer learns a model to distinguish between training instances with benign and malicious labels, resulting in an event classifier that can classify a new event as benign or malicious; and perform event classification on a new set of events, wherein the new set of events has its features extracted, which are then converted into signatures by the feature reducer, and wherein the event classifier takes the signatures and produces a benign or malicious classification for an event within the new set of events.

The noted system can collect or process the collection of events, which can includes computer code in a binary executable file format. The noted feature reducer can use singular value decomposition (SVD) for feature extraction.

The noted feature extraction semantics of a code block of an event can be derived from the code of the code block. The noted family clusterer can produces a collection of families from the signatures using a locality-sensitive hashing (LSH) scheme. The noted LSH scheme can include MinHash scheme. For the noted system, a SESAME system can be used to implement the event classifier and produce a benign or malicious classification for the event within the new set of events.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

[FIG. 3 of Improved SESAME ("A Distributed Architecture for Rapid Classification of Novel Malware")]

FIG. 9 depicts a BinJuice table showing code, corresponding semantics, and corresponding semantic juice, in accordance with exemplary embodiments of the present disclosure.

FIG. 10 depicts another BinJuice table showing challenges in ordering for semantic juice, in accordance with exemplary embodiments of the present disclosure.

FIG. 11 depicts a further BinJuice table with two variant code segments from Win32.Evol and their semantic juice, in accordance with exemplary embodiments of the present disclosure.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

One aspect of the present disclosure provides a cyber vaccine method and related system that are operative to predict the form of future cyberattacks—such as viruses, Trojans, and worms, etc.—and use these predictions to improve the detection and classification of attacks in the future. By predicting the form of the future attacks, before they actually occur, a more effective defense can be implemented against the attacks, potentially ahead of the time they do occur. General aspects of the present disclosure are applicable to any kind of attack that can be represented by features and in which families of attacks develop over time. Examples include, but are not limited to, malware attacks and network-based attacks.

Figure 1:
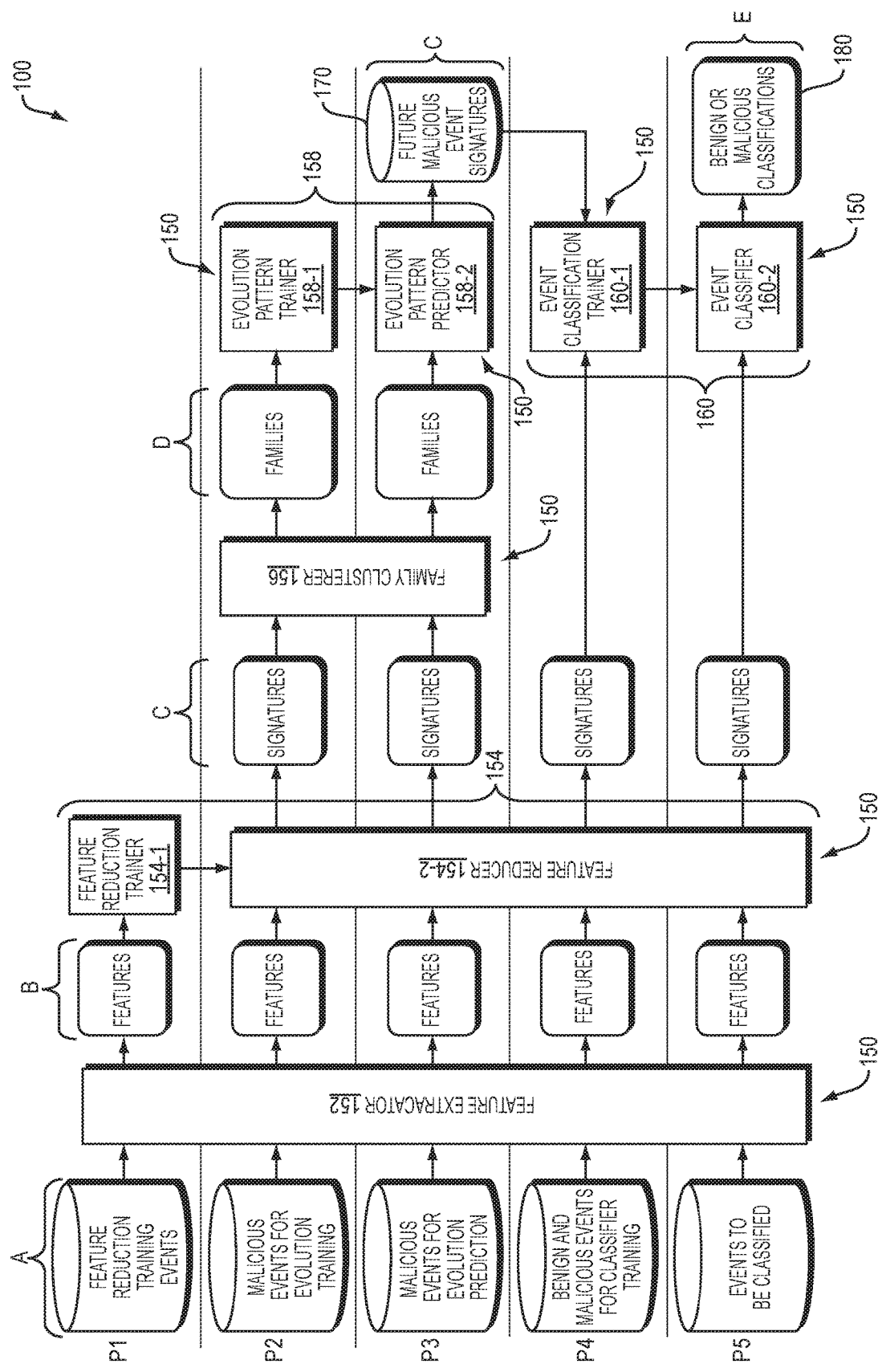
FIG. 1 depicts a general method of a cyber vaccine, in accordance with exemplary embodiments of the present disclosure.

FIG. 1 depicts a diagram of an example of a general cyber vaccine process 100 and related system 150, in accordance with the present disclosure. As shown, cyber vaccine process 100 proceeds in five phases, Phases P1-P5, which are shown separated by horizontal lines. FIG. 1 also shows software architecture components of corresponding system 150 used for implementing process 100. Process 100 may also be characterized as a method or algorithm. The cyber vaccine process 100 uses five data types (A-E): raw events (A), feature vectors (B), signatures (C), families (D), and classifications (E), which are described in further details below.

Raw events (A) are used for the input of each phase and may be malicious or benign. Examples of raw events include software binaries (e.g., binary files or portions or blocks of binary code or sequences of bits) and network activity. Some phases of the algorithm specifically use malicious events, e.g., for training purposes; others, which are just labeled "events", use both malicious and benign events. The events A used in each of the first four phases of the algorithm may be the same or different in each phase. The first four phases (P1-P4) collectively constitute the training of the related system 150 (described in further detail below). The fifth phase, which corresponds to operational use of the system 150, uses events appearing subsequent to the training of the system. The data type of an event is denoted E. The data type of a collection of events is denoted $[\mathcal{E}]$. For the example shown, the raw events indicated, respectively, for the five phases (P1-P5) are Feature Reduction Training Events (P1), Malicious Events for Evolution Training (P2), Malicious Events for Evolution Prediction (P3), Benign and Malicious Events for Classifier Training (P4), and Events to be Classified, e.g., future or new events (P5).

Feature vectors (B) are indicated for each phase (P1-P5) of process 100. These are representations of an event using a vector of features characterizing the event. These features may have any data type, such as Boolean, categorical, integer, real, vector, or graph, etc. Essentially, the features are abstractions of the event using its essential properties. The cyber vaccine process 100 is defined for any representation of an event as a vector of features. Specific implementations of the cyber vaccine process will define a specific representation of features and a process for converting events to features. The data type of a vector of features for a single event is denoted $\square$. The type of collections of featured vectors for different events is denoted $[\![\mathcal{F}]\!]$.

Signatures (C) are indicated for phases the first four phases (P1-P4) of process 100. A signature is a reduced representation of a feature vector of an event, suitable for use in a machine learning algorithm. The data type of a signature is denoted $\mathcal{S}$, and the data type of a collection of signatures is denoted $[\![\mathcal{S}]\!]$. The use of a reduced representation is optional. In some cases, the type $\mathcal{S}$ may be identical to the type $\square$. However, in other cases, it may be beneficial to reduce the features to a more compact representation. Embodiments of the present disclosure are applicable to and can accommodate both cases and any representation of signatures.

Families (D) are indicated for phases the second and third phases (P2-P3) of process 100. A family is a collection of signatures that correspond to a collection of events that are believed to be related. The cyber vaccine is based on learning patterns of evolution of families and predicting the future evolution of families. Since families are collections of signatures, the data type of a family is $[\![\mathcal{S}]\!]$. The data type of a collection of families is $[\![[\![\mathcal{S}]\!]]\!]$.

Classifications (E) are indicated for the fifth phase (P5) of process 100. The output of the final operational phase of the cyber vaccine is a collection of classifications, one for each event with which it is tasked. A classification is a label of an event as either benign or malicious. The data collection of classifications is denoted $\mathcal{C}$. In a supervised learning stage, a collection of signatures with classification labels is used. This collection has type $[\![(\mathcal{S},\mathcal{C})]\!]$.

The example cyber vaccine process 100 shown in FIG. 1 uses, or relies on, five software components in its operation: a Feature Extractor 152, a Feature Reducer 154, a Family Clusterer 156, an Evolution Pattern component 158, and a Cyber Detection component 160; these components are used as a system 150 that implements process 100. Feature Reducer 154 is shown linked with or including a related Feature Reduction Trainer; in the description below, these components are at various instances indicated individually as 154-1 and 154-2, respectively. Evolution Pattern component 158 is shown as including an Evolution Pattern Trainer 158-1 and an Evolution Pattern Predictor 158-2. The Cyber Detection component 160 is shown as including a trainer module ("Event Classification Trainer") 160-1 and a classifier module ("Event Classifier") 160-2.

The Feature Extractor 152 takes an event as input and produces a collection of features for that event. More specifically, Feature Extractor 152 is a function, or code set, code block, algorithm, or routine that implements a function, FE: $\mathcal{E} \to \mathcal{F}$. As discussed above, any suitable method of feature extraction may be used in the cyber vaccine; embodiments of the present disclosure can be used with any or all such methods.

The Feature Reducer 154 takes a collection of features for an event and reduces it to a more compact representation. A Feature Reducer is a function, or code set, code block, algorithm, or routine that implements a function, FR: $\mathcal{F} \to \mathcal{S}$. As discussed above, feature reduction is optional; this can be achieved in the architecture (e.g., as shown in FIG. 1) by using the identity function, which outputs the same features as its input, as a feature reducer. The Feature Reducer requires training, which is achieved by the Feature Reduction Trainer, which is a function, or code set, code block, algorithm, or routine that implements a function, RT: $[\![\mathcal{F}]\!] \to (\mathcal{F} \to \mathcal{S})$. There are many methods for feature reduction in the literature, such as singular value decomposition (SVD) and neural network autoencoders; embodiments of the present disclosure can be used with any or all such methods of feature reduction.

The Family Clusterer 156 takes a population of signatures of events and organizes the events into families based on some concept of commonality among the events. A Family Clusterer is a function, or code set, code block, algorithm, or routine that implements a function, FC: $[\![\mathcal{S}]\!] \to [\![[\![\mathcal{S}]\!]]\!]$. There are many ways of clustering a population into families; embodiments of the present disclosure can be used with any or all such methods of clustering a population into families.

The Evolution Pattern component 158 learns patterns of evolution from a collection of families (Trainer module) and uses these learned patterns to predict future signatures of event families (Predictor module). The prediction is a function from a family to zero or more signatures. Specifically, an Evolution Pattern Predictor is a function, or code set, code block, algorithm, or routine that implements a function, EP: $[\![\mathcal{S}]\!] \to [\![\mathcal{S}]\!]$, where the argument is the existing collection of signatures in the family and the result is the predicted future signatures. The Evolution Pattern Trainer learns such a Predictor from a collection of families; it is a function, or code set, code block, algorithm, or routine that implements a function, ET: $[\![[\![\mathcal{S}]\!]]\!] \to ([\![\mathcal{S}]\!] \to [\![\mathcal{S}]\!])$. Any machine learning method that can learn such a function can be used; embodiments of the present disclosure can be used with any or all such methods of machine learning.

The Cyber Detection component 110 uses a training collection of benign and malicious events to learn how to distinguish between them (Trainer module) and then, given a new event, produces a benign or malicious classification (Classifier module). An Event Classifier is a function, or code set, code block, algorithm, or routine that implements a function, EC: $\mathcal{S} \to \mathcal{C}$, while an Event Classification Trainer is a function, or code set, code block, algorithm, or routine that implements a function, CT: $[\![(\mathcal{S},\mathcal{C})]\!] \to ([\![\mathcal{S}]\!] \to [\![\mathcal{C}]\!])$. Any machine learning classifier that can operate on signatures can be used for this task; embodiments of the present disclosure can be used with any or all such machine learning classifiers. Examples include but are not limited to (i) linear classifiers, e.g., logistic regression classifiers, and naïve Bayes classifiers, (ii) support vector machines (SVMs), (iii) decision trees, (iv) boosted trees, (v) random forest classifiers, (vi) neural networks, and (vii) nearest neighbor classifiers, to name a few.

With continued reference to FIG. 1, the five phases (P1-P5) of the algorithm (process) 100 are shown as horizontal pathways, with phase numbers indicated on the left of the figure. In preferred embodiments, only one item is passed between successive phases. Communication between phases is shown with bold arrows having a vertical component (relative to the horizontal pathways). The phases (P1-P5), described in additional detail below, make use of the components shown in FIG. 1, including Feature Extractor FE 152, a Feature Reduction Trainer RT 154-1, an Evolution Pattern Trainer ET 158-1, a Family Clusterer FC 156, and an Event Classification Trainer CT 160-1, as shown in FIG. 1.

Phase 1 (P1). Feature reduction training: A collection of events has its features extracted. These features are passed to the Feature Reduction Trainer 154-1. The result is a Feature Reducer 154 (154-2) that is used in subsequent phases. Symbolically Phase 1 can be represented as follows:

a. Given a collection of events $E_1$
b. $F_1:=(E_1)$
c. $R:=(F_1)$

Phase 2 (P2). Evolution pattern training: A collection of malicious events has its features extracted, which are converted into signatures by the Feature Reducer 154 (154-2). The Family Clusterer 156 receives the signatures and produces a collection of families from these signatures. The Evolution Pattern Trainer 158-1 receives the families and learns a model of malicious event evolution patterns of these families. The result is an Evolution Pattern Predictor 158-2 that can use this model to predict future signatures in a family. Symbolically Phase 2 can be represented as follows:

a. Given a collection of malicious events $E_2$
b. $F_2:=(E_2)$
c. $S_2:=(E_2)$
d. $M_2:=(S_2)$
e. $EP=(M_2)$ Phase 3 (P3). Evolution pattern prediction: A collection of malicious events has its features extracted, which are converted into signatures by the Feature Reducer 154-2. The Family Clusterer 156 produces a collection of families from these signatures. The Evolution Pattern Predictor 158-2 operates on these families to produce predicted signatures of future malicious events in these families. The result is a collection of Future Malicious Event Signatures 170 (shown as date type C, in P3). Symbolically Phase 3 can be represented as follows:

a. Given a collection of malicious events $E_3$
b. $F_3:=(E_3)$
c. $S_3:=(E_3)$
d. $M_3:=(S_3)$
e. $S_{Future}=(M_2)$ Phase 4 (P4). Malicious event detection training: A collection of benign and malicious events, with known labels, has its features extracted, which are converted into signatures by the Feature Reducer 154-2. These signatures are combined with the Future Malicious Event Signatures 170 (symbolically, $S_{Future}$) produced by the previous phase to create a training collection for the Event Classification Trainer 160-1. Each instance in this training collection consists of a signature and a Benign or Malicious label, with the label of the Future Malicious Event Signatures being Malicious. The Event Classification Trainer 160-1 learns a model to distinguish between training instances with Benign and Malicious labels. The result is an Event Classifier 160-2 that can classify a new event as Benign or Malicious. Symbolically Phase 4 can be represented as follows:

a. Given a collection of malicious and benign events $E_4$, where each event e has a classification label (e)
b. $P:=E_4$ map $(e \rightarrow (R(FE(e)), l(e))$
c. $Q:=S_{Future}$ map $(e \rightarrow (e, malicious))$
d. $EC:=(PUQ)$ Phase 5 (P5). Event classification: In this final phase, newly encountered events (e.g., including future versions of malware as could be encountered subsequent to Phase 4) are classified as benign or malicious. Such a newly encountered event, either benign or malicious, whose label is unknown, has its features extracted, which are converted into signatures by the Feature Reducer 154-2. The Event Classifier 160-2 takes this signature and produces a benign or malicious classification 180 (shown as data type E, in P5). Symbolically Phase 5 can be represented as follows:

a. Given an event e
b. Classification=(R(FE(e))

Further details are provided below for exemplary embodiments of the present disclosure.

Cyber vaccine process 100 and system 150 may be applicable to any kind of attack that can be represented by features and in which families of attacks develop over time. Examples include, but are not limited to, malware attacks and network-based attacks.

Predictive Malware Defense (PMD)

Predictive Malware Defense (PMD) embodiments according to the present disclosure can provide methods (processes or algorithms) and systems that augment and/or replace machine learning-based malware detection systems, and can operate to predict signatures of future malware variants and to "inject" (or, introduce) these predicted variants into the defensive system, like a "vaccine." Such PMD embodiments can utilize deep learning to learn patterns of malware evolution from observed malware family histories. These evolution patterns can then be used to predict future family developments of the malware family or families. Thus, PMD embodiments of the present disclosure can counter or overcome one of the challenges of malware defense, i.e., that the attacker typically has the advantage over the defender. In many cases, an attack is successful and causes damage before the defender can even begin to prepare a defense. Experiment verification of an implemented embodiment of the present disclosure has shown that a detection system augmented with these future malware signatures was able to detect future malware variants that could not be detected by the detection system alone. In particular, the implemented embodiment (method and system) detected eleven (11) new malware variants without increasing false positives, while providing up to five (5) months of lead time between prediction and attack. Thus, PMD embodiments in accordance with the present disclosure can provide, and have been shown to provide, an ability to anticipate malware attacks and prepare defenses before those attacks actually occur; this represents a significant scientific and technological development with practical exemplary applications in cybersecurity.

Embodiments of PMD systems and methods according to the present disclosure provide for preemptive defense, enabling a defender to predict potential future attacks and respond to (or prepare for) them before they happen. In addition to defense preparation, prediction helps with strategic planning and prioritization by focusing effort on the most likely attacks. Just as medical researchers need predictions of which influenza viruses will be most prevalent during the next winter to develop vaccines, cyber defenders need prediction models that forecast malware developments, so they can devise methods to prevent attacks preemptively.

Using advanced machine-learning (ML) techniques to generate malware defenses preemptively, Predictive Malware Defense can shift the advantage from the attacker to the defender through modeling malware evolution. PMD can use models trained on features extracted from currently-known malware families to predict possible courses of malware evolution. PMD captures these predicted futures in signatures of as yet unseen malware variants to function as a malware vaccine. These signatures can advantageously be added to the training set of a ML-based malware detection system so that it can detect these new variants as they arrive. In exemplary embodiments of the present disclosure, a ML-based system, Semi-Supervised Algorithms against Malware Evolution program ("SESAME"), can be used to detect a large number of future variants, potentially long after the system was trained on particular malware (code). More details of a suitable improved SESAME system are provided below.

Figure 2:
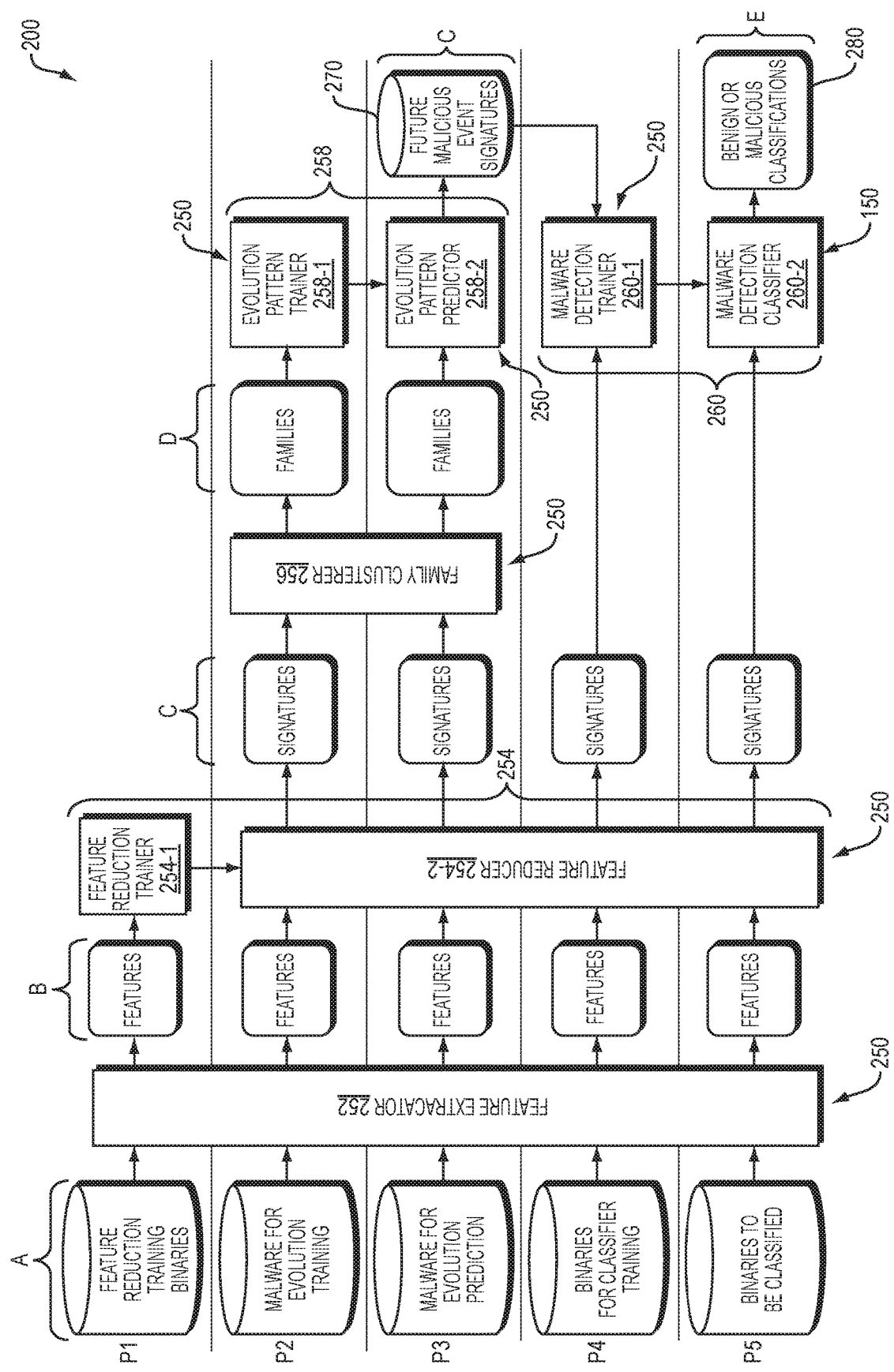
FIG. 2 depicts features and processes for an exemplary embodiment of predictive malware defense, in accordance with the present disclosure.

An exemplary implemented embodiment of the present disclosure is directed to and provides systems and processes (methods) for Predictive Malware Defense, or "PMD," e.g., as described below. FIG. 2 depicts a process 200 and system 250 for PMD according to an exemplary implemented embodiment of the present disclosure. Process 200 can be (and was) used to predict the signatures of future or evolved versions of known malware—the evolved versions can be considered to effectively be offspring, mutations, or evolutions of present malware. PMD process 200 and system 250 can accordingly be used advantageously against future or forthcoming malware attacks. PMD method (process) 200 operates, e.g., with software components of system 250 as shown, to predict signatures of future malware (e.g., executable binaries, or binary code), allowing for the signatures to be injected into a ML-based malware detection system or method. Process 200 can alternatively be referred to as an algorithm or a method.

The PMD process 200 shown in FIG. 2 uses, or relies on, five software components in its operation: a Feature Extractor 252, a Feature Reducer 254, a Family Clusterer 256, an Evolution Pattern component 258, and a Malware Detection component 260; these components are used as a system 250 that implements process 200. Feature Reducer 254 is shown linked with or including a related Feature Reduction Trainer; in the description below, these components are at various instances indicated individually as 254-1 and 254-2, respectively. Evolution Pattern component 258 is shown as including an Evolution Pattern Trainer 258-1 and an Evolution Pattern Predictor 258-2. The Malware Detection component 260 is shown as including a trainer module ("Malware Detection Trainer") 260-1 and a classifier module ("Malware Detection Classifier") 260-2. As illustrated in FIG. 2, PMD process 200 has five phases (P1-P5). Process 200 uses five data types (A-E): raw events (A), feature vectors (B), signatures (C), families (D), and classifications (E), similar to the cyber vaccine process 100 described for FIG. 1. For the example shown in FIG. 2, the raw events indicated, respectively, for the five phases (P1-P5) are Feature Reduction Training Binaries (P1), Malware for Evolution Training (P2), Malware for Evolution Prediction (P3), Binaries for Classifier Training (P4), and, Binaries to be Classified (P5).

As will be understood, PMD process 200 can be a general method that applies to any feature representation. The five indicated phases are as follows: (P1) learning how to extract and reduce the features of binaries to a compact representation; (P2) learning a model of malware evolution; (P3) using the learned evolution model to predict signatures of future malware; (P4) training a malware detection system on a training set including these new features; and (P5) using the malware detection system to classify incoming binaries as benign or malicious. Common to all phases of PMD process 200 and system 250 is a Feature Extractor 252 that extracts meaningful features from raw binaries (data in raw binary format); further details on feature extraction and of specific features and feature representations are described below.

With continued reference to FIG. 2, the first phase of the PMD process 200 (Phase 1) is to learn a compact representation of the features suitable for machine-learning (ML) algorithms. A set of training binaries ("Feature Reduction Training Binaries"), including both benign and malicious samples, has their features extracted by the Feature Extractor 252. These features are then passed to a Feature Reduction Trainer 254-1. Various methods can be used for feature reduction, including, but not limited to, neural network autoencoders. In an evaluation of an exemplary embodiment, singular value decomposition (SVD) was used. Other suitable methods of feature reduction can be used within the scope of the present disclosure, in addition to or substitution for SVD. In all subsequent phases of PMD, the extracted features go through the Feature Reducer 254-2 to produce what may be referred to as "signatures" (data type C). These are the fundamental units used by the malware detection system 250 and method 200; they capture the essential characteristics of each binary, as far as the detection system 250 and method 200 are concerned.

In the second phase (Phase 2), PMD (process 200, system 250) learns—or performs or conducts the learning of—patterns of malware evolution. PMD's concept of evolution is based on malware families; PMD predicts how a family will continue to evolve based on its early history. Therefore, an initial step in learning evolution patterns is to identify malware families. For PMD process 200 and system 250, Family Clusterer 256 can perform or facilitate this family-identification, grouping, or clustering function. In preferred embodiments, the Malware Analysis and Attribution using Genetic Information (MAAGI) system and/or method can be used for identifying malware families; of course, other suitable methods and/or systems can be used instead or additionally. MAAGI uses a clustering algorithm to associate similar malware into families, based on their signatures (a description of a MAAGI system and method is provided below with reference to FIG. 7). Using this database or set of malware families, the Evolution Pattern Trainer 258-1 learns a predictive model of the future evolution of a particular family based on its observed history. The third phase of PMD (Phase 3) uses this predictive model to predict signatures of future malware variants in each family, resulting in a set of future malware signature 270. Training and operation of the Evolution Pattern Predictor 258-2 are described below.

The final two phases of PMD (Phases 4 and 5) correspond to training and testing of a ML-based malware detection system. In the training phase (Phase 4), the PMD-generated future malware signatures 270 are added to a training set of malicious and benign binaries to generate the Malware Detection Classifier 260-2. In the final phase (Phase 5), this classifier is used to classify incoming binaries as benign or malicious, resulting in benign or malicious classifications 280 for the newly encounter (incoming) binaries. PMD can improve this classifier's ability to detect malicious binaries, without increasing its false positive rate.

To evaluate an implemented embodiment of PMD, a SESAME-based system was first trained only on existing malware. It was found that the system alone was able to detect a large percentage of future malware. An embodiment of PMD was then used to predict signatures of future variants and these signatures were then added to the training set of SESAME system. As noted, it was found that augmentation with the PMD-determined (predicted) signatures enabled the SESAME system to detect eleven (11) new variants that were not detected with the SESAME system alone, without any new false positives. The result, thus, corroborates that a PMD malware vaccine can be an effective tool for cyber defense. Further details of the evaluation of PMD process 200 and system 250 are provided below, with continued reference to FIG. 2.

Feature Representation: PMD malware vaccine (process) 200 can constitute a general approach that is agnostic to the specific feature set of given malware. In experimental verification of implemented PMD process 200 and system 250, a feature set was used that had previously been developed and found to be useful for identifying similarities and detecting malware. Surface features were used, such as strings and API calls made by each binary. Main features, however, came from a deep static analysis of the malware.

Each code block was taken and its semantics were derived from the code's assembly code. Extracting the semantics of binary code can be performed by any suitable method or software framework. The BinJuice method, described in further detail below, was used (by Feature Extractor 252) for an exemplary implemented embodiment. BinJuice can determine the computation being performed by the code block, abstracted away from the specific code instructions used to perform it. As a result, it is robust to some kinds of obfuscation and code polymorphism. It is easy to change the specific sequence of code instructions used to perform a certain computation; it is harder to change the computation itself without changing the functionality of the binary. As noted, the present disclosure is not limited to use of BinJuice, and other semantics derivation methods may be used for alternate embodiments of the present disclosure; examples of other suitable methods, include, but are not limited to, BinSlayer, BitShred, and iBinHunt.

Next, each procedure in the binary was considered as a collection of code blocks. When organizing malware into families or classifying a new binary as benign or malicious, procedures in different binaries are compared for similarity. Since a procedure is represented as a collection of code blocks, a natural metric for similarity between procedures is Jaccard distance (or, Jaccard Similarity), which computes the intersection of the code blocks in the two procedures divided by their union. Jaccard distance, however, can be expensive to compute. MinHash is an efficient locality-sensitive hashing (LSH) scheme for approximating the Jaccard distance. MinHash uses a set of random hash functions to select individual code blocks to represent a procedure. The Jaccard distance can be approximated by the fraction of hashes in which the blocks selected for the two procedures are equal; to capture this, a set of representative blocks were generated for each procedure, according to a set of random hash functions.

The final step in constructing the features uses the procedure call graph. The idea is that if two binaries have similar procedures that call similar procedures, this provides a strong indication that the two binaries are related. N-grams of the representative blocks were created from the procedure hashes, where the n-grams follow paths in the procedure call graph. These three sets of features—strings, API calls, and procedure hash n-grams—were then passed to the Feature Reducer 254-2 to obtain a compact set of features. For each binary, this compact set of features constitutes the signature of the binary.

Family Clustering: one of the main steps in PMD process 200 is identifying families of malware. A family represents a set of samples that are believed to share a common lineage. The main principle used is that binaries that have similar features are likely to share a common lineage and therefore should be placed in the same family. Family identification then becomes a task of clustering malware signatures into groups based on similarity.

Suitable classification mechanisms can be based on finding the nearest neighbors of any given binary, meaning the other binaries that are most similar to it. There are many different methods—nearest neighbor searches (NNS)—suitable to find nearest neighbors. Some of them return exact solutions, which are generally very slow. Others return approximate solutions, which can be generated much more quickly, especially when storage space is not an issue.

In exemplary embodiments, SESAME (i.e., system and/or method) preferably uses a version of locality-sensitive hashing (LSH) for its nearest neighbor search. LSH is an approximate search method that uses a set of randomly generated hash functions to hash items in a high-dimensional space, so that items that are near to each other have a high probability of being hashed to the same bucket. By using a number of random hash functions, and partitioning them into band hashes in which each hash must match in order to return a hit, this approximate search can be tuned to provide an assurance that any matches above a certain similarity threshold will be returned with a certain probability, and similarly, that any components below a certain threshold will not be returned with some probability. While LSH is preferred, other methods/techniques can be used for nearest neighbor searching (NNS), within the scope of the present disclosure, e.g., greedy searches in proximity neighborhood graphs, including proximity graph methods such as Hierarchical Navigable Small World (HNSW) and Metrized Small World algorithms; other NNS techniques may be used in alternative or addition to the noted ones.

When performing LSH, a hash family is specified. A hash family specifies a way to generate an infinite number of random hash functions that can be applied to your data. In this case, after the features of the binaries are extracted and encoded using the deep learning autoencoder, each binary is represented by a set of floating-point vectors of some length d, one per feature type. These vectors are what need to be hashed by the LSH Compiler, and for this a random line projection scheme, which creates a hash family that generates hash functions for floating-point vectors of length d. Many different schemes of this nature have been used to perform nearest-neighbor search in Euclidean space.

In the noted exemplary method, to create a hash function, a single random line is chosen through the d-dimensional space, and the line is divided into buckets of length a. To hash a particular binary using this hash function, the binary's autoencoded vector is projected onto the line, and the ID of the bucket into which the projection falls is the hash value. While projecting into the same bucket does not mean that two vectors are close, the closer together they are, the more likely they will fall into the same bucket for any given line. In a scheme with n hash functions and b bands, a band is composed of a set of n/b hashes. For any two binaries to be declared nearest neighbors as part of a search, they much hash into identical sets of buckets for at least one entire band of hashes.

In order to use this scheme to optimally to enable rapid nearest neighbor search, however, the key is to be able to quickly identify any binaries that have a matching band of hashes. To enable this, the LSH search was implemented on top of MongoDB, a distributed NoSQL database. The hashes for each band for each binary are stored in the database, which is indexed on the band values. Therefore, the matches for any binary can be located extremely quickly, simply by query on each band and returning the results.

In alternative embodiments, a hierarchical clustering-based algorithm can be used for family clustering. In one embodiment, an algorithm that was used was developed to meet the challenge of clustering a large number of binaries in a relatively short amount of time and continuing to operate effectively even as the full database of binaries becomes very large. The incremental algorithm was designed that processes binaries in batches and adds them to an existing cluster hierarchy, refining the clusters as it does that. The algorithm creates a cluster hierarchy. The leaves of the hierarchy correspond to individual families. Higher levels of the family are abstractions of the families beneath them. The families beneath a higher-level node are similar to each other to some extent. Nodes closer to the leaves represent families that are more near to each are represented by exemplars, which represent aggregates of the binaries in the cluster. Preferably, this aggregation operation is transitive, that is, application of the operation to the exemplars directly beneath a cluster produces the same result as application of the same operation to all the binaries at the leaves beneath the same cluster.

One naïve approach—referring to a simple or naïve Bayes model—to processing a new set of binaries is to recluster the entire set of families. Although this will produce an ideal clustering, it is not scalable as the size of the full database grows very large. Another naïve approach is to simply add the new binaries to existing clusters, perhaps creating new clusters for binaries that are not similar to any existing cluster exemplars. This approach, however, does not fully take advantage of the information from the new samples. For example, a new binary may reveal that two binaries that were previously believed to be unrelated are both related to the new binary and therefore should belong to the same cluster.

Alternatively, a set of new binaries added to a cluster may reveal that there are actually two strains within the cluster and it should be split into two. For the implemented embodiment of FIG. 2, an approach was used that avoids full reclustering while allowing restructuring of the hierarchy as necessary. The approach first adds each binary to an existing family at a leaf of the hierarchy. It then goes through a sequence of cluster splitting and merging actions. These actions were orchestrated to avoid excessive reclustering of the hierarchy. Transitivity of the aggregation operation can be used to ensure correctness of the algorithm.

Evolution Pattern Learning and Signature Generation: A family history or lineage is generated for binaries that are determined to belong to a same family. In an exemplary implemented embodiment, using MAAGI (described in further detail below), the binaries that were identified as belonging to the same family were taken and a family history or lineage for those binaries was reconstructed. Part of this reconstruction used temporal information about the binaries, including the compiler timestamp (which may be obfuscated) and the time it was first seen in the wild (encountered) according to VirusTotal. This family history—the features of the binaries, the structure of the lineage graph, and the temporal information—becomes the data available to the evolution pattern learning (P2, 258-1).

In its most general form, to learn evolution patterns, each family history at can be split (divided) at a time point, resulting in past and future family histories. A prediction problem can be defined to predict the future history from the past history. The training set consists of a set of family histories split in this way. In operation, the state of a family is taken at the current point in time at which the prediction is being made; the existing family history up to that point can be treated or considered as the past history. The future history of that family extending from the current time is then predicted.

This represents the general defined framework of exemplary embodiments. For implementation, the information that is to be used from the past histories should be specified; so, too, should the information that is be predicted about the future histories. Since families can come into being at any time, contain any number of time points, and stay alive for a variable amount of time, the size and time span of the past and future histories is variable. In previous experiments, high-level family properties were predicted, such as whether a family would have any more variants or the remaining lifespan of the family. Perhaps surprisingly, it was found that predictions could be made that were significantly better than random even when the past history consisted of a single binary. In exemplary embodiments, predictions can be made of signatures of future family members for use in anti-malware systems, effectively like malware vaccines. Because predictions are made of a complex structured output with many unknown relationships between the features in the output, a learning framework that can discover these hidden relationships is preferably used. Deep neural networks are excellent at discovering hidden features and relationships, provided they are provided with enough data. In experiments, a deep neural network was used, the inputs of which were the features of the most recent family members; the output was the signature of the next family member. It was found that using the three most recent family members as input, along with features of the cluster exemplar, worked well. When a family had fewer than three members in the past history, the corresponding inputs were simply set to zero.

ML-Based Malware Detection: PMD is a general approach that can work with any machine learning-based malware detection system that uses a training set of benign and malicious binaries to learn a classifier. In a preferred implemented embodiment of PMD, the specific ML system used the SESAME system/method, exemplary details of which are described below. After predicting the signatures of the next variant in families in its training set, these signatures were added to SESAME's training set for learning the classifier 260-2. SESAME is a non-parametric classifier that uses a nearest neighbors approach to classification. Given an incoming binary, the most similar binaries are found in the training set and the new binary is classified according to the classifications of the similar binaries. SESAME is designed, however, to provide rapid classification, and searching an entire database for the nearest neighbors can be expensive. Therefore, in preferred embodiments, LSH can be used to quickly search for close neighbors, without necessarily finding exactly the nearest neighbors. As described earlier, MinHash was used to compare sets of procedures, which consists of sets of blocks. Here, in comparing signatures, which are vectors of features, Jaccard distance (approximated by MinHash) is not appropriate. Instead, super-bit LSH is preferably used, which approximates the cosine similarity between two signatures.

Testing and Results: To test and evaluate the effectiveness of an implemented embodiment of PMD method 200, results from an external evaluation of SESAME performed by AV Comparatives (https://www.av-comparatives.org) were used as a baseline—for comparison with results on detecting future malware that were achieved with a SESAME-based system augmented with PMD method 200. In this evaluation, the task was detecting current malware, not future malware. The binaries used for training and testing came from the same time period.

For this noted baseline testing, the version of SESAME did not use the Feature Reducer. The full feature set of strings, API calls, and procedure hash n-grams was used (with n=2). The goal of this evaluation was to measure the ability of SESAME to detect malicious binaries that evade a commercial-off-the-shape (COTS) AV system (software package). For the testing, SESAME was trained only on binaries caught by the AV system (Microsoft Security Essentials) and was tested on binaries that were known to be malicious but evaded the AV system. Specifically, SESAME was trained on about 114,000 binaries classified by Microsoft Security Essentials as malicious, as well as 10,000 binaries known to be benign. The test set consisted of about 12,000 malicious binaries that were not detected by the Microsoft AV, as well as 10,000 more benign binaries.

The Microsoft AV, without SESAME, was able to detect 90.2% of the samples. Of the 9.8% of samples missed by Microsoft, SESAME was able to detect 83.9% of them, raising the overall detection rate from 90.2% to 98.4%. This showed a capability to detect novel malware on which SESAME was not trained. The SESAME system, however, had a significant false positive rate of 27.4%. The high false-positive rate was believed to be because the benign samples represented a very small fraction of the training set and because a whitelist was not used. Training on a larger set of benign samples and use of a whitelist could significantly reduce the false positives.

SESAME's ability to predict future samples was evaluated, without PMD. This helped in understanding the degree and speed with which malware evolves from the point of view of an ML-based malware detection system and provided a baseline against which the ability of PMD to detect additional future variants could be measured.

For the evaluation and comparison, a dataset with 107,201 malware binaries clustered into 13,078 families was used. The earliest sample in the dataset was first seen (by VirusTotal) on May 22, 2006. The most recent was first seen on Jan. 16, 2013. Because many families die off or become stagnant, however, a decision was made to only include data from the three (3) years (January 2009 to December 2011) before the test period. The last year (2012=January 2013) was used as the test period for malware. To train SESAME, 8,705 benign binaries were also used, which were treated as one family for feature selection purposes. Since benignware evolution was not being predicted, the benign binaries were simply split 80/20 for SESAME training and testing. The benign binaries were excluded when training PMD.

Because the dataset was historical, the tests were conducted with Windows 32 bit binaries. Nothing in the general approach or methods according to the present disclosure is specific to these kinds of binaries. In general, a PMD malware vaccine can be applied to any kind of program, including Android apps. The only difference is in the feature extraction, which may be a frontend to PMD.

In the evaluation, SESAME used the reduced feature set, again with n=2 for the procedure hash n-grams. For the SVD for the feature reducer, the input vectors were projected into 500 dimensions, using all the dimensions as features. For the super-bit LSH, a super-bit depth of 64 was used, the value 512 was used as the number of super-bits, and 500 was used as the code length. In this test, SESAME was able to detect 70% of future samples appearing in 2012-13. SESAME had a 9% false positive rate. Although this was significantly lower than the previous evaluation, it was determined to be unsuitably high. Once again it is noted that a very small training set of benign binaries was used and a whitelist was not used, two things that, if changed, would likely mitigate the false positive rate. While the median lead time to detect future malicious binaries was just nine (9) days, SESAME was able to detect occasional binaries much further into the future, up to a maximum of 355 days. These results indicated an effective bound on SESAME's malware evolution prediction (SESAME operating alone without PMD). It appears that a large majority of future samples are closely enough related to current malware that they can be detected by a ML-based classifier. Perhaps one explanation for these results is that some new samples might be obtained just by changing options in kits. Another explanation is that newer samples might keep enough material from older samples to be detected. Also, because BinJuice analyzes code semantics, it might have detected some of the automated ways malware authors use to generate new variants.

For the comparison, PMD (200 and 250) was trained using the same malicious binaries from the 2009-2011 period used to train SESAME. Only families with at least two samples were used to train PMD. Only features from samples that appear before PMD's training cutoff were used. Additionally, it was required that any feature (string, import, n-gram) had to appear in at least 5 families to be included in the final data. Also, any 'ubiquitous' features that appeared in more than 2000 families were removed. Some samples had zero features after these restrictions, and after removing them, some families had zero samples.

All in all, after applying these restrictions, 923 families and 64311 features were left to train PMD. For the neural network, a simple architecture with 2 hidden layers with 50 nodes each was used. The hyperbolic tangent was used as the activation function and training was performed to a maximum of 100,000 epochs. The neural network was not significantly tuned; deep neural networks are known to be highly sensitive to tuning, so the results should be considered the beginning of what can be achieved using this approach. Also, the parameters used for SVD or super-bit LSH were not tuned. Improvements in performance could be expected with tuning of the neural networks and/or the parameters used for SVD or super-bit LSH.

After training the neural network to learn patterns of malware evolution, the neural network was used to predict signatures of future samples in each family. This provided 923 additional signatures. Those signatures were added to SESAME's training set and retrained the SESAME system. After retraining, SESAME was able to detect 11 additional samples, with no new false positives. The median lead time was again 9 days, while the maximum lead time was 5 months.

Accordingly, embodiments of the present disclosure can provide PMD methods and systems that detect new samples of malware, potentially with no false positives. Using advanced machine-learning (ML) techniques to generate malware defenses preemptively, embodiments of PMD can shift the advantage from the attacker to the defender through modeling malware evolution. PMD can use models trained on features extracted from currently-known malware families to predict possible courses of malware evolution. PMD captures these predicted futures in signatures of as yet unseen malware variants to function as a malware vaccine. These signatures can advantageously be added to the training set of a ML-based malware detection system so that it can detect these new variants as they arrive.

Components, methods, and architectures useful for exemplary embodiments of PMD are described below.

I. Distributed Architecture for Rapid Classification of Malware

Exemplary embodiments of the present disclosure can utilize a distributed architecture for rapid classification of novel malware based on Semi-Supervised Algorithms against Malware Evolution (SESAME) to classify malware in a way that is robust to obfuscation, is capable of detecting the hidden features of malware, and is able to handle the large volumes of malware encountered in an enterprise environment. SESAME uses advanced semantic features, deep machine learning (ML) algorithms, and a scalable architecture. Further details of the distributed architecture and SESAME are provided below.

The problem of malware classification and detection is more relevant than ever, and with the increasing use of polymorphic and other obfuscation techniques, the velocity with which novel malware samples appear in the wild continues to increase, negating the effectiveness of manual signature creation. While machine learning techniques have been used to infer signatures in the wild, researchers have identified ways to game the classifiers and predict which binaries the algorithms will classify as benign or malicious, establishing the feasibility of developing malware that can evade detection by these automated malware detectors. This paper describes a malware classification system that attempts to meet these requirements.

Introduction: As cyber-attacks become more common, and malware continues to play an important role in the initiation, persistence, and execution of these attacks, the problem of malware classification and detection is more relevant than ever. And with the increasing ability of malware authors to easily and automatically manipulate their code, using polymorphic and other obfuscation techniques, the velocity with which novel malware samples appear in the wild continues to increase. According to McAfee the rate at which new malware binaries appear is currently over 100,000 per day. This volume of novel malware negates the effectiveness of manual signature creation. In addition, even while machine learning and data mining have been used to automatically infer malware signatures, researchers have identified ways to game the classifiers and predict which binaries the algorithms will classify as benign or malicious. By so doing, they have established the feasibility of developing malware that can evade detection by these automated malware detectors.

These factors compose a very challenging environment in which to perform malware defense, which imposes certain requirements on any successful classification system. This section describes an exemplary malware classification system that attempts to meet these requirements, useful in conjunction with the Semi-Supervised Algorithms against Malware Evolution (SESAME) systems and methods. SESAME uses advanced semantic features, deep machine learning (ML) algorithms, and a scalable architecture to classify malware in a way that is robust to obfuscation, capable of detecting the hidden features of malware, and able to handle the large volumes of malware encountered in an enterprise environment.

Typical systems use basic features such as strings or API imports, which can be obfuscated using simple techniques, or sequences of instructions, which are susceptible to more sophisticated methods of obfuscation such as code polymorphism, which alters the instructions without changing the functionality of the binary. SESAME therefore uses advanced features based on a declarative representation of the semantics of code blocks, which accurately represent what the code does, rather than how it does it. It then abstracts away variable names and constants to produce a generalized model of those semantics. This method has produced identical semantic representations of altered code blocks between different versions of polymorphic malware, resulting in features that are harder to obfuscate without changing the actual function of the code.

Many of today's ML-based malware classification systems also use simple, linear learning algorithms like naive Bayes that are relatively susceptible to manipulation by a sophisticated adversary. SESAME uses deep learning, which in other domains has proven capable of learning difficult concepts that are hard for other methods to capture. Specifically, a stacked artificial neural net autoencoder was used, which captures the hidden structure of a malware sample in a non-linear way. The system is trained over a labeled subset of malicious and non-malicious samples, producing a model that is used to encode incoming samples. This encoding produces vectors that represent the hidden features of the malware that are essential for accurate classification.

To ensure that the system scales or is scalable to the needs of modern malware defense, it was developed it to be a scalable, distributed enterprise-based system. An endpoint application provides rapid classification locally on end-user client machines, while a centralized cloud system stores the complete database of samples, handles the learning of the autoencoder model, and performs full-featured on-demand classification of edge cases that cannot be classified on the endpoint above a specified confidence threshold. To ensure speed and scalability, the classification method is based on an efficient locality-sensitive hashing (LSH) technique built on top of a distributed NoSQL database.

Figure 3:
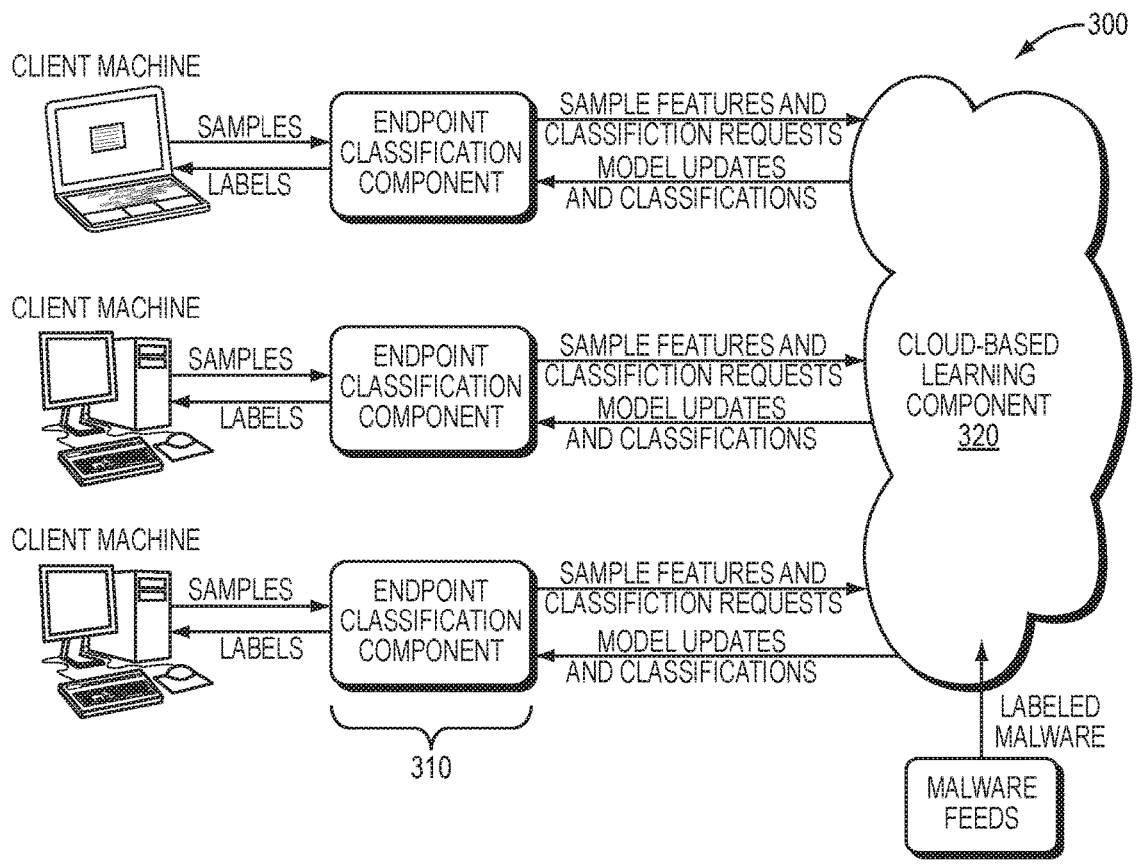
FIG. 3 depicts architecture of a SESAME system, in accordance with the exemplary embodiments of the present disclosure.

Classification System Architecture: to handle the large amounts of novel malware that are typically discovered each day, SESAME was designed with scalability in mind. It was also designed to operate in an enterprise environment, where client machines are exposed to binaries that need to be classified, and a central server, or servers, provides support for classification. FIG. 3 depicts a diagram of a system 300 according to an exemplary embodiment.

The system 300 includes two main elements: an Endpoint Classification Component 310 and a Cloud-based Learning Component 320. The Endpoint Classification Component 310, or the endpoint, is the initial point of contact that SESAME has with target binaries. It is an application that runs on client machines and provides rapid local classification of binaries. The Cloud-based Learning Component 320, or the cloud, hosts the database, performs training, and provides on—demand, full—featured classification of edge cases. The cloud is designed to scale along with the availability of system resources. It can also run over a distributed cluster of machines through its use of message queues to manage load and a distributed NoSQL database for storage. The cloud is made up of several components. The main controller application ingests and extracts features from samples during training, and manages the system's workload during classification. The autoencoder performs deep learning over a set of training samples, to encode a representation of the hidden structural features that provide the most accurate classification. The database stores the features extracted from the binaries, and the autoencoded and hashed versions of them as well. The AMQP message server hosts the work queues for distributing work among the components.

Along with its two major components, SESAME also has two distinct modes of operation: offline learning and online classification. During learning, binaries that have been labeled as either malicious or benign are fed into the Cloud-based Learning Component 320. These samples are used to both train the deep learning component and to populate the database that will be searched when classifying new binaries. This process may be time consuming and is only performed occasionally, while the system continues to run. The database is also reduced to a representative subset, which is copied to the endpoints along with the trained deep learning model. During online classification, the goal of the Endpoint Classification Component is to classify an incoming binary sample as malware or benign as quickly and accurately as possible, using only information available at the endpoint. To the extent that the endpoint is able to make a confident determination, it provides a classification label immediately. In case it is unable to, it requests help from the cloud. The cloud performs a more thorough analysis and returns a label to the endpoint, which is then provided to the client machine.

Figure 4:
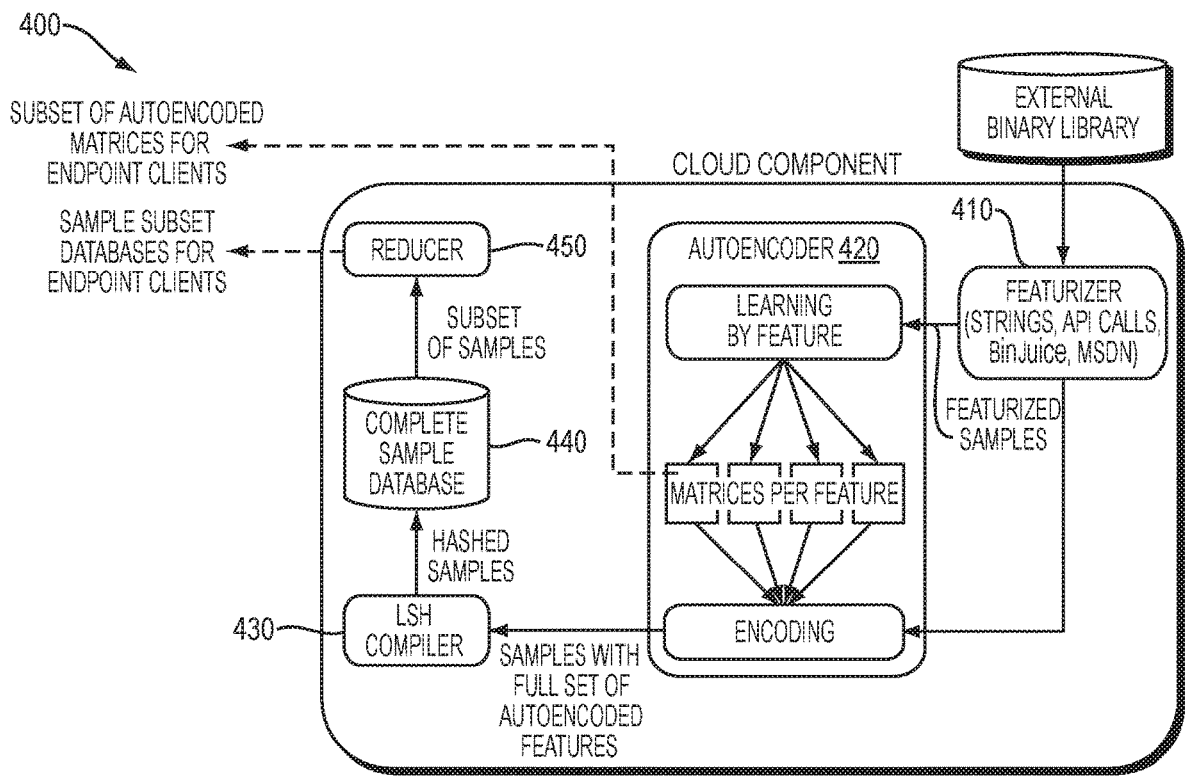
FIG. 4 depicts architecture of an offline classification portion of a cloud component of a SESAME system, in accordance with exemplary embodiments of the present disclosure.

During the offline training stage, the SESAME system trains its classification mechanism over a set of labeled malicious and benign binaries. This training occurs on the cloud. FIG. 4 depicts architecture 400 of an example of an offline classification portion of the cloud component, in accordance with exemplary embodiments of the present disclosure.

In operation, the binaries are first ingested by the cloud and the features are extracted from each binary by the Featurizer 410. The features extracted include the strings and API calls, as well as the semantic BinJuice features. They can optionally include other advanced features as well, such as search results returned from the Microsoft Developers Network (MSDN) based on searches of the strings and API calls found in the binary. These features are then stored in the database, to optionally use later, if needed, during full—featured classification of edge cases.

Once the features have been extracted, the Autoencoder 420 uses a deep neural network-based machine learning method to train a series of autoencoding matrices over the features, one per feature type. These autoencoding matrices are then stored in the database. The matrices corresponding to strings and API calls are also sent to the endpoints. At that point, each binary's features are fed to the autoencoding matrices in order to retrieve an encoded version of the features, in the form of a high-dimensional vector of floating—point values. These encoded representations are then stored in the database as well.

The autoencoded vectors are then passed to the locality sensitive hashing (LSH) Compiler 430, where they are compiled into hashes that will allow efficient nearest-neighbor searches over the database during classification. To facilitate that search, they are stored in the database in a way that provides an index that supports querying for particular hash values in constant time. These stored hashes form the Complete Sample Database 440.

The Reducer 450 then selects a subset of the hashed features in the database that comprise a representative sample of the complete data set. This portion of the database will be transferred to the endpoints in preparation for classification.

Figure 5:
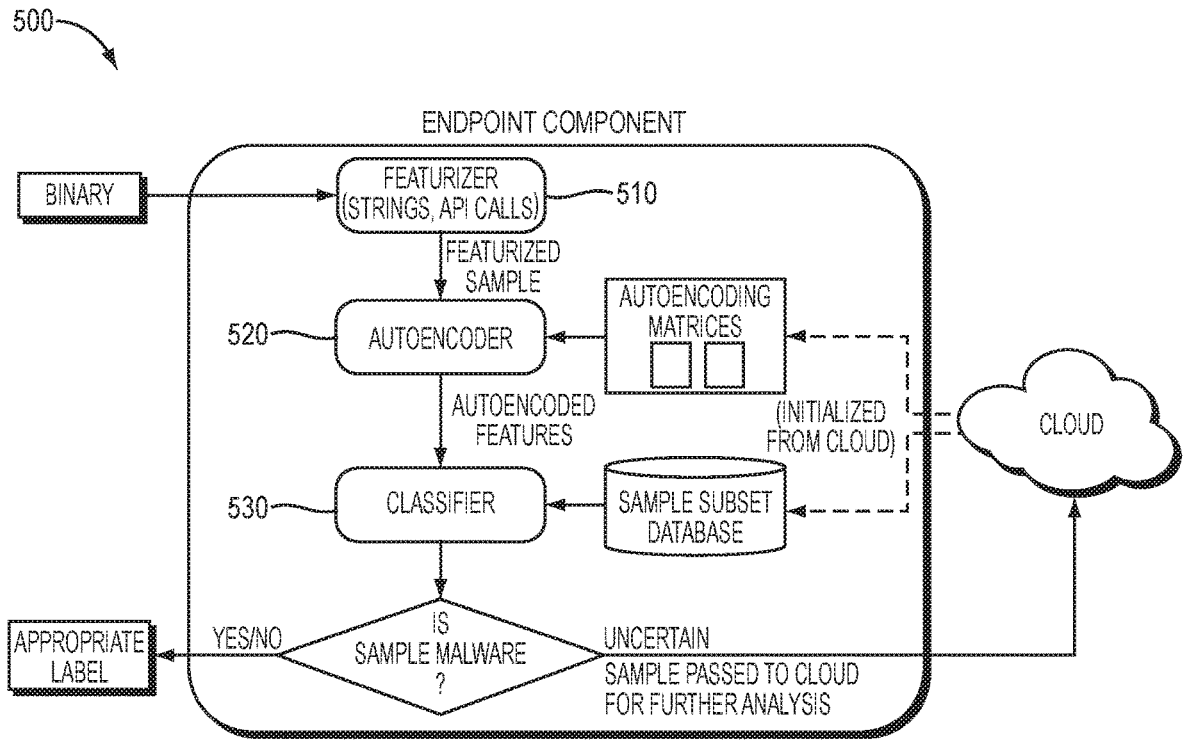
FIG. 5 depicts architecture of an endpoint component of a SESAME system, in accordance with exemplary the present disclosure.

Classification: During classification, binaries are ingested by the Endpoint Classification Component on the client machines. FIG. 5 depicts an example of architecture of the endpoint component 500 of an exemplary embodiment.

The Featurizer 510 extracts simple features from the binaries, specifically the strings and API calls, which can be extracted rapidly from the binary. These features are then encoded into floating-point vector representations by the Autoencoder 520, using the autoencoding matrices, which are the trained deep learning models that were learned during the training stage and downloaded from the cloud. These autoencoded feature vectors are intended to capture the essence of the binary. They portray the hidden structure features of the binary better than the strings and API calls can on their own. The autoencoded features are sent to a Classifier 530, which uses a Sample Subset Database to identify the most similar samples to the binary that needs to be classified. This database contains only a subset of all samples that have been seen, to avoid using too much memory on the endpoint. The database takes the form of a set of hash tables produced by the cloud using locality-sensitive hashing (LSH), which makes the search for similar samples efficient. This is the same LSH scheme that was applied to the vectors from the labeled binaries during training.

These hashed versions are used to search the representative subset database for the binary's nearest neighbors, or its most similar matches. Based on the nearest neighbors that are returned by the LSH search, a classification is determined, along with a confidence value. The binary is classified using the label of the nearest neighbor, and the confidence value is calculated according to $|(d_m-d_b)|/\sqrt{d_m^2+d_b^b}$, where $d_m$ is the distance to the nearest malicious neighbor, and $d_b$ is the distance to the nearest benign neighbor. Since the only version of these binaries that is available on the endpoint is the locality-sensitive hashed version, the distance is based on the similarity between these hashes.

If the confidence value is above a specified threshold, then the classification is accepted. This threshold is set by the user, and can be different for a benign and a malicious classification. The malicious threshold is generally set higher, in order to create a higher burden of proof in order to classify a sample as malicious, which cuts down on false positives.

Figure 6:
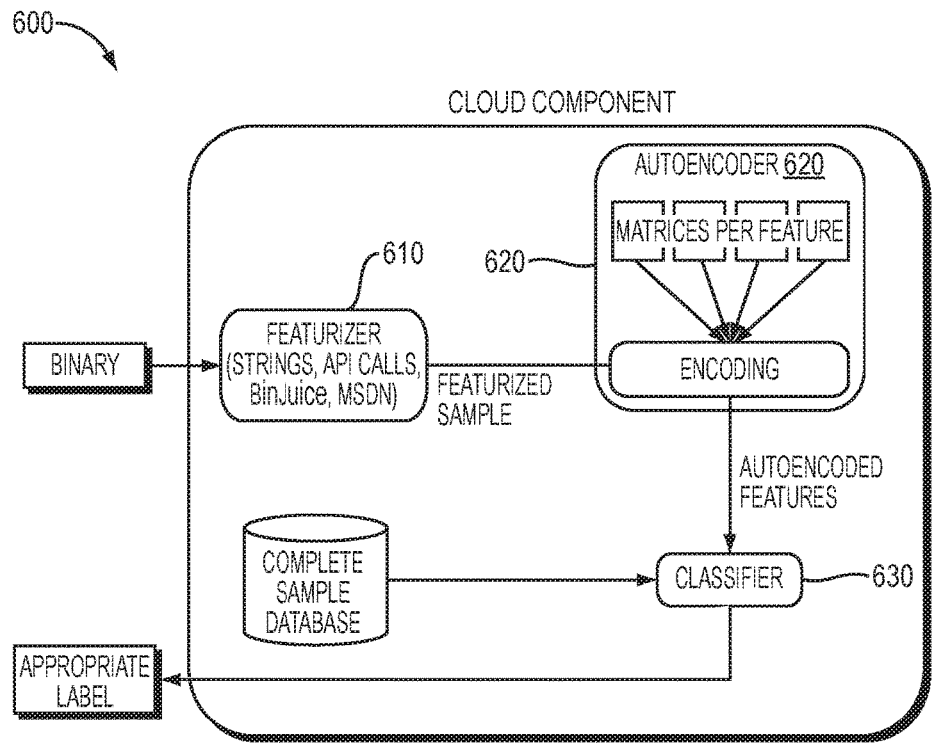
FIG. 6 depicts architecture of an online classification portion of a cloud component of a SESAME system during a classification stage, in accordance with exemplary embodiments of the present disclosure.

If the confidence value is lower than the threshold, then it is sent to the cloud for analysis. FIG. 6 depicts an example of architecture of the online classification portion 600 of the cloud component, in accordance with exemplary embodiments of the present disclosure.

On the cloud, a received binary is first passed through the Featurizer 610. On the cloud, the BinJuice code semantics, and optionally other features such as Microsoft Developers Network (MSDN) search results are also used, in addition to the strings and API calls. These features are more expensive to extract but it was found during investigations that they provide significant additional insight. The rest of the architecture is similar to the endpoint. The features go through the Autoencoder to produce autoencoded features. In this case, there are four autoencoding matrices corresponding to the four feature types. The autoencoded features go through the Classifier 630, which this time uses the Complete Sample Database that contains all samples that have been seen previously. Again, the search for similar samples is made efficient using LSH. Thus, the cloud performs a more thorough analysis than the endpoints in two ways: by using the additional features, and by comparing to all previously samples. The cloud then performs LSH search over the entire database. Similarly to on the endpoint, the binary is classified to its nearest neighbor, and a confidence value is calculated. In this case, however, the full feature representations of every binary are available, that is what is preferably used for these two determinations. The near-neighbors that are returned by the LSH search are each compared to the target binary by their actual features, and that is the distance metric that is used. The distance measurement used is the Jaccard index between the two sets of features from the two binaries. The Jaccard indexes from the various types of features are weighted and combined to get an overall distance measurement. The classification is then returned to the endpoint.

Implementation: in this section, details are provided of the implementation of the various components of an exemplary system implemented as a working prototype. First, a description is given of the features chosen to extract from the binaries that form the basis for binary comparison and classification, and some details about how those features are extracted. Then, a description is given for a deep learning method that was applied to these features to generate the vector of hidden features. Then a discussion is given for an implementation of the locality-sensitive hashing (LSH) method for nearest neighbor search that was used for rapid classification.

Feature-Based Representation: SESAME's method of using deep learning and LSH to classify malware is agnostic to the features over which it operates. However, to maximize the effectiveness the system against polymorphic malware, it is critical to extract features that are robust to polymorphic code transformations. For this reason, in addition to basic features such as strings and API calls, SESAME preferably also uses BinJuice, a method to extract a generalized representation of the semantics of code blocks, called juice. In its most basic form, each code block produces a string describing its semantics, which can be used in a simple bag-of-words model. BinJuice uses symbolic interpretation of code blocks to determine each blocks semantics, or the effect that the execution of each block has on the program state. The symbolic interpreter includes an algebraic simplifier that normalizes a large class of code variations introduced by equivalence preserving transformations. The semantic juice is then extracted by generalizing the semantics to substitute register names and literal constants by logic variables. Relationship between literal constants is maintained as algebraic constraints between the corresponding logical variables. Thus, the juice forms a semantic template that is expected to be identical for code variations due to register renaming, memory address allocation, and constant replacement. Semantically equivalent code fragments can then be found by structural comparison of their juice.

BinJuice's features have been used successfully in advanced malware analysis applications, including for identifying components. They have also been used for online hierarchical clustering of malware. In that case, the juice was used to create advanced features that partially encoded the semantics of the code blocks along with the structure of the malware, specifically the procedure call graph.

To extract the juice from each binary, the feature extraction component on the SESAME cloud utilizes the VirusBattle web service, which provides an API for submitting binaries and then querying for various types of analyses, including juice. Since extracting the juice from a binary takes a significantly longer amount time than extracting the strings or API calls, juice is preferably not used on the endpoint, to keep classification on client systems as fast as possible. Also, since extracting the juice from the functional code segments of a binary requires that the binary be unpacked, VirusBattle also includes an implementation of a highly effective, generic unpacker. Because of this, SESAME has access to the features from both the packed, and unpacked versions of all packed malware, and uses both versions for training.

Experiments were also conducted using the Microsoft Developer's Network (MSDN) to glean even more information about how the features of the binaries, such as particular strings and API calls, factor into different discussions among developers on MSDN. This idea builds off previous work by researchers that used web resources, in particular Stack Overflow, to characterize malware, by matching strings in the malware to topics in Stack Overflow, which were labeled by functionality. Here, the web sources can be used to provide additional features of the malware that are then used as features for classification, in the same way as other features like BinJuice, or the strings and API calls themselves. In this case, each MSDN document is a feature. For any binary, a search can be performed on MSDN for its strings and API calls, and each document returned by the search is a feature of the malware.

The idea is that the profile of documents a binary hits in MSDN is somehow characteristic of the binary, and malware typically has a different profile from benignware. Use of individual MSDN documents as features could result in too many features to provide a good characterization. But by performing deep learning over these features, it is possible to identify characteristic profiles of malicious and benign documents.

In the experimentation with MSDN features, it was found that they are too time expensive to extract to be practical at this point. In limited anecdotal tests, however, it was found that they can provide significant additional insight.

Deep Learning: One of the challenges in applying machine learning to malware is the huge number of features. In this case, the features are the semantics, or juice, of the code blocks, along with the strings and API calls. A given data set of malware has an extremely large number of distinct block semantics, each of which becomes a feature for learning. The number of unique strings per malware, barring any sort of filtering or pre-processing, is also very high. Standard learning approaches like naive Bayes, support vector machines, and decision trees, use all the features, and do not capture structure in the features. Using deep learning has been shown to dramatically reduce the number of features, by identifying features that summarize a large number of different features while describing the essential nature of what makes a binary malicious or benign.

The preferred approach is to use a neural network autoencoder. This is a neural network in which the input and output layers are the same. In the network, the weights between the input and hidden layer and between the hidden and outer layer are preferably forced to be the same. The neural network is trained to learn the weights. Once trained, each hidden node then contains a high-level feature of the inputs. These high-level features then become the features of a traditional learning algorithm.

These features were then provided to an autoencoder to extract high level features of the malware. The simplest autoencoder possible is a three layer neural network. Its topology is restricted in that the output layer must have the same number of units as the input layer. Its weights, which are initialized randomly, and its biases, which are initialized to zero, are trained by back-propagation using the input values of each training item as the target outputs. The autoencoder used by the system described in this paper is further constrained in two ways. The weights between the hidden units and the output layer are constrained to be equal to the transpose of the weights between the input units and the hidden units. Secondly, the bias update rule is modified to impose sparsity constraints on the hidden units. The sparsity constraint has the effect of making each hidden unit active for only a small percentage of the items in the training data. Once training of the autoencoder is complete, the hidden units can be used to generate a lower dimensional sparse feature representation of the data.

This method was also extended to build a stacked autoencoder, which uses multiple layers of a neural network. One goal is to obtain a smaller number of more informative features that will lead to both better speed of training and classification and higher accuracy. A stacked autoencoder is an artificial neural network which differentiates itself from a basic autoencoder by having two or more hidden layers, each trained on the output of the previous layer. This builds off of the concept of a sparse autoencoder. A sparse autoencoder is similar to other autoencoders except that, a sparse autoencoder is constructed such that the average activations of hidden units is low. Since sparsity is a layer-wise measure, in a stacked sparse autoencoder, it is handled by each individual layer during the training phase.

Nearest-Neighbor Search: A useful classification mechanism can be based on finding the nearest neighbors of any given binary, meaning the other binaries that are most similar to it. There are many different methods to find nearest neighbors. Some of them return exact solutions, which are generally very slow. Others return approximate solutions, which can be generated much more quickly, especially when storage space is not an issue.

As noted previously, SESAME (i.e., system and/or method) preferably uses a version of locality-sensitive hashing (LSH) for its nearest neighbor search. LSH is an approximate search method that uses a set of randomly generated hash functions to hash items in a high-dimensional space, so that items that are near to each other have a high probability of being hashed to the same bucket. By using a number of random hash functions, and partitioning them into band hashes in which each hash must match in order to return a hit, this approximate search can be tuned to provide an assurance that any matches above a certain similarity threshold will be returned with a certain probability, and similarly, that any components below a certain threshold will not be returned with some probability. While LSH is preferred, other methods/techniques can be used for nearest neighbor searching (NNS), within the scope of the present disclosure, e.g., greedy searches in proximity neighborhood graphs, including proximity graph methods such as Hierarchical Navigable Small World (HNSW) and Metrized Small World algorithms; other NNS techniques may be used in alternative or addition to the noted ones.

When performing LSH, a hash family must is specified. A hash family specifies a way to generate an infinite number of random hash functions that can be applied to your data. In this case, after the features of the binaries are extracted and encoded using the deep learning autoencoder, each binary is represented by a set of floating-point vectors of some length d, one per feature type. These vectors are what need to be hashed by the LSH Compiler, and for this a random line projection scheme, which creates a hash family that generates hash functions for floating-point vectors of length d. Many different schemes of this nature have been used to perform nearest-neighbor search in Euclidean space.

In the noted method, to create a hash function, a single random line is chosen through the d-dimensional space, and the line is divided into buckets of length a. To hash a particular binary using this hash function, the binary's autoencoded vector is projected onto the line, and the ID of the bucket into which the projection falls is the hash value. While projecting into the same bucket does not mean that two vectors are close, the closer together they are, the more likely they will fall into the same bucket for any given line. In a scheme with n hash functions and b bands, a band is comprised of a set of n/b hashes. For any two binaries to be declared nearest neighbors as part of a search, they much hash into identical sets of buckets for at least one entire band of hashes.

In order to use this scheme to optimally to enable rapid nearest neighbor search, however, the key is to be able to quickly identify any binaries that have a matching band of hashes. To enable this, the LSH search was implemented on top of MongoDB, a distributed NoSQL database. The hashes for each band for each binary are stored in the database, which is indexed on the band values. Therefore, the matches for any binary can be located extremely quickly, simply by query on each band and returning the results.

Experiments and Results: To test the ability of the SESAME system to classify malware, experiments were continuously using a data set of around 100,000 malicious and benign binaries. The malicious portion of the data set was a subset of a collection made available by the Defense Advanced Research Projects Agency (DARPA). Benign samples were collected by scanning several machines for binary files, and scanning those files using common anti-virus software. For each test, 1,000 binaries of each class are set aside for testing, and the rest are used to train the system. The binaries used for testing were selected by choosing the first 1,000 binaries of each class numerically by SHA-1 hash value to approximate a random selection is preferably used. Among the 99,753 training samples, 92,414 are malicious and 7,339 are benign.

Although all 99,753 training samples are used to train the SESAME classification system, only a small subset is used to train the deep neural net autoencoder component, which is a costly operation. In this case, a 1,000 samples subset was chosen to train the autoencoder matrices, half of which were malicious and half of which were benign. Like the training set, these were also chosen numerically by SHA-1, with the caveat that the samples have all of the features on which training was performed. After that, to train the system, all 99,753 samples were fed into the cloud component: the binaries are put through feature extraction, the features of each type are passed through the corresponding autoencoder matrix to produce feature vectors, these vectors were hashed using the noted LSH scheme, and the hashes are stored in the database for rapid querying during testing. The database was then reduced to a representative subset, and this reduced database was copied, along with the autoencoder matrices for strings and API calls, to the endpoints.

For testing, the 2,000 test binaries are handed to the endpoint. As was discussed previously, the endpoint extracts the strings and API calls from the binary, autoencodes them, hashes them, and tries to classify the binary using its representative subset database. Samples classified with insufficient confidence are then passed to the cloud. This produces three results: the classification results decided on the endpoint itself, the results decided on the cloud, and the overall results.

The SESAME system includes a number of parameters that can be tuned, all of which impact performance in various ways. These include the features used, the autoencoder learning parameters, the number of samples trained on, and the LSH hashing parameters, among others. Besides classification accuracy, the different outcomes that are affected by these parameters include the percentage of samples that can be handled at the endpoint, the false positive rate, the training and testing speed, amount of memory and disk space required, etc.

For these results, the strings, API calls, and juice blocks from each binary were used for both the LSH search and full-featured comparison during cloud-side classification. On the endpoint, the confidence threshold for malicious classification was 0.90, with a 0.25 threshold for benign classification. LSH search was performed using a line-projection hash bucket size of 0.0001, with 25 bands of 2 hashes each.

The final parameter to adjust is the confidence threshold for malicious classification on the cloud. Viewing the results with a confidence threshold of zero best demonstrated the actual results of the search, so those were examined first. Confusion matrices were derived for the binaries that were able to be classified on the endpoint; cloud-side classification was also performed. These confusion matrices resulted in a 99.5% classification accuracy on the endpoint and a 89.2% accuracy on the cloud, for an overall classification accuracy of 93.2%. Also 786 of the 2000 binaries were able to be handled on the endpoint for rapid classification. One binary failed during feature extraction and was therefore not able to be processed and is not included in the results.

One immediate issue was the 7.3% false positive rate (FPR), which can be considered as much too high. A mechanism for reducing the number of false positives can be to adjust the cloud-side malicious classification threshold. By imposing a threshold of 0.25, for example, the false positive rate may be decreased to 1.0%, while maintaining an 88.0% overall classification accuracy.

Another reason for the number of false positives may have been the data set that was used. The benign samples that were used for training had been passed through anti-virus software to confirm that they were not flagged as malicious. The malicious samples, however, constituted a subset of a data set of over 2 million binaries, and while that data set was believed to be reliable source of malware, there was no confirmation that every binary indicated as being malicious actually was. To see whether such uncertainty could have any effect on obtained results, manual checks could be performed. For example, for every false positive in a test set, one can look at the malicious training sample that was returned by the LSH search as that binary's nearest neighbor. Then search can be performed for that training sample on a service such as VirusTotal.com, which aggregates anti-virus reports, to see whether that sample was actually a benign sample that was mislabeled as malicious.

For example, in manually checking the training samples that led to the 10 false positives from the 0.25 threshold run, VirusTotal.com showed that 5 of those were actually declared benign by all of the anti-virus vendors that had scanned the binary, of which there are between 40 and 45 per sample. This includes the 1 false positive from the endpoint. Two others were flagged as malicious by only two vendors, and two others were flagged by 7 vendors. The other was flagged by about half of the vendors. So, while it would take a closer look at say for sure, it is possible that only one of the false positives in this case was truly an instance of a benign binary being classified to a malicious training sample.

Conclusion: In this section, we've outlined a SESAME system, and described a functioning implementation, which was trained and tested using a data set of over 100,000 malicious and benign binaries. The results of conducted experiments show SESAME's approach to classifying malware is feasible, sound, and effective. An implemented embodiment of SESAME was able to achieve an overall classification accuracy as high as 93.2% on 2,000 testing binaries, rapidly classifying 786 binaries on the client machine at 99.5% accuracy.

II. Malware Analysis and Attribution Using Genetic Information (MAAGI)

As noted above, exemplary embodiments of the present disclosure can utilize Malware Analysis and Attribution using Genetic Information (MAAGI) architectures, systems, and methods. See Pfeffer, A., et al., "Malware analysis and attribution using genetic information," presented at the Malicious and Unwanted Software (MALWARE), 2012 7$^{th}$ International Conference on, 2012, pp. 39-45. Further details of MAAGI are provided below.

Abstract. As organizations become ever more dependent on networked operations, they are increasingly vulnerable to attack by a variety of attackers, including criminals, terrorists and nation states using cyber-attacks. New malware attacks, including viruses, Trojans, and worms, are constantly and rapidly emerging threats. However, attackers often reuse code and techniques from previous attacks. Both by recognizing the reused elements from previous attacks and by detecting patterns in the types of modification and reuse observed, one can more rapidly develop defenses, make hypotheses about the source of the malware, and predict and prepare to defend against future attacks. These objectives can be achieved in Malware Analysis and Attribution using Genetic Information (MAAGI) by adapting and extending concepts from biology and linguistics. First, analyzing the "genetics" of malware (i.e., reverse engineered representations of the original program) provides critical information about the program that is not available by looking only at the executable program. Second, the evolutionary process of malware (i.e., the transformation from one species of malware to another) can provide insights into the ancestry of malware, characteristics of the attacker, and where future attacks might come from and what they might look like. Third, functional linguistics is the study of the intent behind communicative acts; its application to malware characterization can support the study of the intent behind malware behaviors. For an implemented embodiment, a system was developed that uses a range of reverse engineering techniques, including static, dynamic, behavioral, and functional analysis that clusters malware into families. The malware lineage was determinable in some situations. Using behavioral and functional analysis, a number of functions and purposes of malware were determined.

Introduction: As organizations become ever more dependent on networked operations, they are increasingly vulnerable to attack by a variety of attackers, including criminals, terrorists and nation states using cyber-attacks. New malware attacks, including viruses, Trojans, and worms are constantly and rapidly emerging threats. A lack of a deep, automated analysis of malware makes it hard to identify novel attacks, characterize the source of attacks (e.g., where does it come from and from what type of attacker), and forecast future attacks.

Currently, manual analysis is relied upon, which is extremely time consuming and does not scale to the large amount of malware being encountered. Meanwhile, current automated systems use heuristics, such as signatures, to detect malware. These fail to detect most novel attacks because they do not provide a way to connect novel malware to known malware. They also provide no basis for characterizing malware sources or forecasting future malware developments. The approach to developing a deep understanding of malware relies on two key insights, each of which produces a useful analogy. First, attackers often reuse code and techniques from one malware product to the next. They want to avoid having to write malware from scratch each time, but they also want to avoid detection, so they try to hide similarities. If one can understand reuse patterns and recognize reused elements, one will be able to connect novel malware to other malware from which it originated, create a searchable database of malware with relationships based on similarity, and predict and prepare to defend against future attacks. This insight suggests a biological analogy, in which a malware sample is compared to a living organism. Just like a living organism, the malware sample has a phenotype, consisting of its observed properties and behavior (e.g., eye color for an organism, packer type of a sample). The phenotype is not itself inherited between organisms; rather it is the expression of the genotype, which is inherited.

Likewise, it is the source code of the malware that is inherited from one sample to the next. By reverse engineering the malware to discover its intrinsic properties, one can get closer to the genetic features that are inherited.

The second insight is that the function of malware has a crucial role to play in understanding reuse patterns. The function of malware—what it is trying to accomplish—is harder to change than the details of how it is accomplished. Therefore, analysis of the function of malware is a central component of the MAAGI program (including related methods and systems). In analysis of malware function, a linguistic analogy can usefully be employed: a malware sample is like a linguistic utterance. Just like an utterance, malware has temporal structure, function, and context in which it takes place. The field of functional linguistics studies utterances not only for their meaning, but also for the function they are trying to accomplish and the context in which they occur.

In this section, an example of a Malware Analysis and Attribution Using Genetic Information (MAAGI) program is described. The program, which is currently at the end of its second year, has already produced promising results in determining malware similarity, clustering malware into families, determining the temporal ordering of malware, generating malware lineages, and identifying behaviors and purposes of malware. MAAGI uses an array of reverse engineering techniques, including semantic and functional analysis, coupled with a central evolutionary analysis component that fuses these analyses to determine the malware lineage.

Background: One of the advantages of MAAGI's approach was that it largely did not compete with existing research; it borrowed significantly from it. While the genetic, evolutionary, and linguistic-based malware analysis tools are innovative, especially in their ability to reason about attackers, they are also related to a variety of existing efforts that each attempt to analyze malware for the purposes of recognizing and identifying attacks.

Using a centralized arbiter allows for incorporation and reuse of many of these existing techniques and leveraging their particular strengths and insights into the analysis of the phylogeny of malware and the classification of malware instances. There has been significant work over the past two decades in detecting and classifying malware. For instance, static, binary-level analysis is still the most common type of analysis used by anti-virus software. This approach looks at the object code of the incoming executable to try to identify bit strings that have been seen in previous malware attacks. This approach is able to rapidly detect previously seen malware and some instances of novel malware where there is significant binary-level overlap. Unfortunately, it is easily fooled into giving false negatives by minor changes to the code at the higher-level program level (e.g., moving functions around, adding no-ops or uncalled dummy functions), changing the packing algorithm used, or changing which compiler is used (or which flags are given to a compiler). It can also give false positives because non-maliciously packed software can share a packer header that is bitwise identical. To address these weaknesses, a range of new techniques have been developed, each of which makes an attempt to abstract away from the raw, static binary.

For instance, a simple improvement is to do a bitwise comparison on the unpacked code. It is also possible to analyze the call-graph structure to detect which code is actually callable. Or, one can use dynamic analysis where the suspected malware is executed in a safe sandbox and its runtime performance is evaluated against the behavior of historical instances of malware. All of these, however, have their own weaknesses. Static analysis, even of unpacked code, is still vulnerable to many forms of obfuscation, such as code transposition. Callgraph analyses are vulnerable to other forms of obfuscation, such as creating callable but un-called functions. And dynamic analyses are vulnerable to mimicry, attacks on the analysis system itself, and malicious behavior that only happens after some time (e.g., on a particular date).

The use of many types of analytic techniques is similar to the multiple types of analysis used by biologists who study organisms' external anatomy (e.g., looking at the presence of hair), internal anatomy (e.g., looking at organs), behavior (e.g., nocturnal animals, nesting animals), the ecological habitat (e.g., which animals live in a certain ecological niche), genetics (e.g., which animals share significant amounts of genetic material and which genes), and evolution (e.g., which species descended from which other species). Just as in biology, where each of these types of analysis is useful but insufficient to characterize the subject fully, each of the current approaches to analyzing malware has specific advantages and disadvantages.

Figures 7, 8:
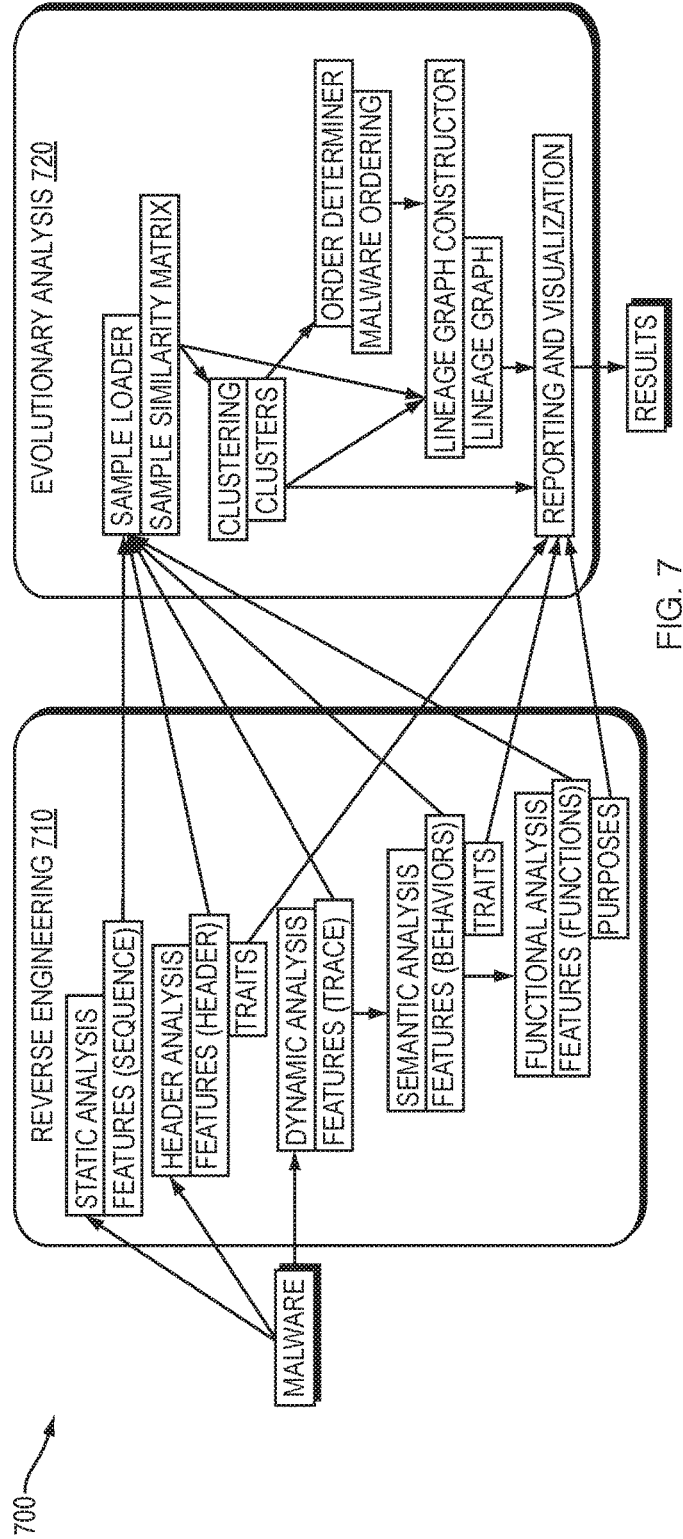
FIG. 7 depicts architecture of a MAAGI system, in accordance with exemplary embodiments of the present disclosure.
FIG. 8 depicts a portion of a MAAGI behavioral analysis table, in accordance with exemplary embodiments of the present disclosure.

System architecture. FIG. 7 depicts a diagram of a general architecture used for a MAAGI system 700, in accordance with exemplary embodiments. Malware (or potential malware) enters the system either as historical instances or live data coming in from the network. MAAGI system 700 consists of two major subsystems: Reverse Engineering 710, which operates on each individual malware to obtain features of the malware that are not present at the surface; and, Evolutionary Analysis 720, which operates on the entire set of malware as a whole to cluster the malware and produce a lineage graph. The outputs of the system are Clusters of the malware into families, a Lineage Graph, and identified Traits and Purposes of the malware.

Reverse engineering 710. One of the main principles behind MAAGI is that combining a variety of analyses can produce better results than each individual analysis method. Accordingly, the Reverse Engineering component consists of five different kinds of analysis, each of which produces malware Features: Header Analysis is a simple component of the MAAGI system, but one that produces much useful information. It processes the malware's PE header, which is useful both for characterizing the malware and for clustering and lineage construction. The header features are passed to the evolutionary analysis.

Dynamic Analysis analyzes the behavior of the malware, which is executed in a Secure Sandbox. Dynamic analysis consists first of trace analysis, which uses AIS's Cuckoo dynamic trace environment with special-purpose hooks to produce the execution trace of the malware. The traces become features for the evolutionary analysis. Trace analysis then feeds into Semantic Analysis, which analyzes the sequence of system calls made by the malware, together with a semantic understanding of the calls and their arguments, to identify behaviors of the malware. The Semantic Extractor (SemEx) merges dynamic API traces and expert programming knowledge to build an RDF graph that can be searched for patterns that identify high level behaviors. The patterns can contain many relations, including temporal orders and data flow relations. For example, the semantic extractor can determine whether the malware makes a network connection, receives data on that specific connection, writes that specific data to a file, and then executes that specific file.

According to functional linguistic theory, it is as important to understand the function and context of an utterance and its components as it is the plain meaning of the words. The same principles can be applied to malware through the noted Functional Analysis component. The functional analysis takes in behaviors found by the semantic analysis and analyzes them using the framework of probabilistic systemic functional grammars (PSFGs). Behaviors are parsed using a PSFG to infer functional classes. An explicit many-many mapping between functional classes and characterization/attribution classes can then be used. For example, given input behaviors ReadDriverSetupLog and CopySelfFoUSB, one can infer that the malware is air gap capable and self-replicating, and possibly that the attacker has anti-forensics knowledge.

For an example of semantic analysis, the semantic analysis that was performed on directory walks is now described. In a trace file a set of related invocations was observed. The relationships included data dependencies and juxtapositions. The simple directory walk that was observed looked like the following: (FindFirstFile, CreateFile, ReadFile, ReadFile, ReadFile, CloseFile, Send, FindNextFile, CreateFile, ReadFile, ReadFile, ReadFile, CloseFile, Send, FindNextFile, FindClose). In this case, the FindFirstFile invocation returns a value of type HANDLE which is consumed by the subsequent FindNextFile and FindClose invocations. This allows one to infer the existence of a directory walk containing all of these invocations. Note that it is important (but not required) that the application have a failed FindNextFile and successful FindClose at the end of the sequence, as these allow one to know that the walk has ended due to normal completion.

To break this down, and label individual invocations as part of higher level behaviors, a table was created of invocations labeled with semantic tags, or lower level behaviors (LLBs), where each invocation is associated with the intermediate level behaviors (ILBs) and high level behaviors (HLBs) to which it belongs. The table is then encoded in an RDF structure. FIG. 8 shows the first part of a MAAGI table Boo, in accordance with exemplary embodiments of the present disclosure.

In addition to the wider directory walk, one can infer other HLBs and ILBs that occur inside of the directory walk steps. A specific example of this in the example above is that two files are read until the end of the file. In the noted ontological system, containment relationships are added to capture these additional behaviors, e.g., "DirectoryWalk-n has steps 1-2; DirectoryWalk-n-Step-1 contains behavior ReadUntilEndFile-j; DirectoryWalk-n-Step-2 contains behavior ReadUntilEndFile-k".

Such semantic and functional analyses have already made significant progress towards being able to characterize useful properties of malware. For example, an automated MAAGI analysis of a Koobface sample was performed in which a number of behaviors were found, including directory walks and file searches, file downloads and concurrent execution. The MAAGI system has the potential to assist malware analysts by automatically discovering behaviors that previously required time-consuming analysis to find. In addition, MAAGI can be used to detect a number of purposes of malware in some cases, such as Remote Access Tool (RAT), virus, rootkit, dropper, reconnaissance, keylogger, and destruction.

Evolutionary analysis 720: the first step of Evolutionary Analysis is to compare the similarity between malware samples based on their features. Similarity is computed by a memory-efficient component called the Sample Loader, which uses a tree structure to produce a similarity matrix from the features of all the samples. In this similarity matrix, rare features are weighted more highly, because sharing a rare feature provides stronger evidence of a relationship between samples than a common feature.

A useful hypothesis is that using multiple feature types to measure malware similarity produces significantly better results than any single feature. This hypothesis has been borne out in conducted experiments. For validation, the individual similarity matrices obtained from seven features, as well as the matrix obtained from combining all these features, were obtained. The data for these experiments was a collection of 140 malware samples from eight families. Each similarity matrix had samples across the rows and columns, so that each entry indicates the similarity between the row and column sample. Brightness indicates the degree of similarity. The samples were sorted by true family, so the ideal similarity matrix contained eight bright squares along the diagonal. Of the input matrices, the one from static analysis came closest to this ideal, but lacked definition in many of the families. Some of the behavior and header features found greater similarity within some of the families, but also found strong similarities between samples in different families. In addition, these features were found to be completely missing in some of the samples. The combined output was, qualitatively, by far the closest to the ideal similarity matrix, and it is robust to missing inputs for some feature types.

After the similarity matrices were computed, the Clustering component clustered the malware into families. The goal was to group samples that were strongly related, maximizing intra-cluster similarity (cohesion) and minimizing inter-cluster similarity (adhesion). Using hierarchical clustering, the level of the hierarchy was chosen to maximize the cohesion/adhesion tradeoff. Two alternative clustering algorithms were used: the Louvain algorithm, which is an agglomerative algorithm that maximizes the modularity of clusters based on in-links and out-links; and the Girvan-Newman algorithm, which is a partitional algorithm that iteratively removes edges that are most between two clusters. Since clustering is strongly dependent on good similarity, it naturally improves as more features are combined.

To determine the lineage of malware, it is very important to know the order in which samples were generated. Without this information, it would be hard to determine the direction of parent-child relationships. The compiler timestamp in the header is an indication of the time at which malware is generated, but it may be missing or obfuscated. It should not be ignored completely, however, as it provides an accurate signal in cases where it is not obfuscated. The challenge of determining ordering is to (a) determine which samples have obfuscated timestamps, and (b) determine the correct times of those samples. To achieve these goals, the Order Determiner uses two additional pieces of information. First, it uses the size of the sample, as a proxy for sample complexity, since samples within a family tend to grow in complexity over time. Second, it uses the similarity between samples as a signal, since similar samples should be close to each other in time.

All this information was fused using a probabilistic graphical model, containing variables representing the true and observed timestamp of each sample, as well as a variable indicating whether the timestamp was obfuscated. Soft constraints were placed on the timestamps enforcing the size and similarity heuristics. A graphical model was implemented in the Figaro probabilistic programming language, which enables probabilistic models to be expressed as programs making it easy to express these complex constraints. For further details on the Figaro probabilistic programming language, see, e.g., Pfeffer, A., "Practical Probabilistic Programming," Manning Publications Co. Greenwich, Conn., USA 2016; and Pfeffer, A., "Figaro: An object-oriented probabilistic programming language," Charles River Analytics Technical Report, 2009.

Because the analyzed malware corpora did not include ground truth about the generation times of malware, benign software was used to evaluate the ordering algorithm. Results were obtained for one such dataset, the MCMap Github repository. In each experiment, the timestamps of some of the samples were obfuscated and then attempts were made to recover the ordering of all samples. The similarity heuristic alone was found to perform extremely well with smaller amounts of obfuscation but tails off with larger amounts, while size alone performed less well with smaller amounts but held up well even with 100% obfuscation. Combining size and similarity provided the benefit of both. In particular, Combined 1:2, which weighted size twice as highly is similarity, was found perform almost as well as similarity alone with lower levels of obfuscation, and as well as size alone with higher levels.

The final step in evolutionary analysis is the Lineage Graph Constructor. Lineage construction may be viewed, according to embodiments of the present disclosure, as an optimization problem. One objective can be to provide the best possible explanation of the features of each sample. In general, a feature can be explained in one of three ways: it can be inherited from a parent, a mutation of a feature of a parent, or fresh (generated de novo). The first explanation may be preferable; however, it may also be preferable to minimize the number of parents of a sample, since most samples will be generated from a small number of parents (often one). In addition, simpler structures may be preferred for the lineage as a whole.

While many algorithms to solve this problem were explored, a preferred final algorithm was a combination of a directed best parent algorithm, which optimizes individual parent-child relationships, and a minimum spanning tree algorithm, which optimizes the lineage as a whole. That algorithm, called best parent with minimum spanning merging, combines the best of both approaches. First, it identifies the best parent of each sample. Then, it creates strong straight line sublineages using the best parents. Finally, it merges sublineages using the minimum spanning tree. Lineages are constructed for each cluster separately, and then merged as appropriate.

An evaluation was made of the MAAGI lineage construction algorithm on benign samples from Github as well as a hand-generated dataset consisting of fifteen malware samples with known ground truth (labeled as "Risk Reduction Dataset" in the figure). The precision and recall of the MAAGI parent-child predictions was measured. Defining TP as the fraction of parent-child relationships in the ground truth lineage that were correctly identified by the algorithm, FN as the fraction of correct parent-child relationships that were not identified by the algorithm, and FP as the fraction of parent-child relationships identified by the algorithm, then the precision can be defined by the following:

TP/TP+FP, while recall is TP/TP+FN.

There is a natural tradeoff between false positive and false negative rate that is captured by precision and recall. To summarize precision and recall, the F-measure was reported, which is defined to be the following:

$$2 \frac{\text{Precision} \cdot \text{Recall}}{\text{Precision} + \text{Recall}}.$$

Three algorithms with two versions each were compared. The three algorithms were best parent alone, minimum spanning tree, and best parent with minimum spanning merging. For each algorithm, both the basic version that operated on all clusters simultaneously and the version that built lineages on individual clusters separately before merging them as appropriate were considered. It was observed that the cluster guided versions of the algorithms do better in all cases, and especially on the malware dataset. An explanation for the significant difference in the malware dataset is that that dataset contained a large number of noise samples that could interfere with the lineage; by focusing the lineage constructions on identified clusters, mixing the noise samples in the lineage is avoided. Of the three algorithms, it was observed that best parent with minimum spanning merging was slightly better than the others. Overall, the algorithm achieved a precision-recall Fmeasure of 73% on the Github data and 92% on the malware.

Conclusion: MAAGI systems and methods have proven useful. MAAGI uses reverse engineering, including semantic and functional analysis, and evolutionary analysis to determine the lineage of malware and characterize its source.

III. Fast Location of Similar Code Fragments Using Semantic "Juice"

As noted above, exemplary embodiments of the present disclosure can utilize Fast Location of Similar Code Fragments Using Semantic "Juice" (or, "BinJuice") systems and methods. See Lakhotia, A., et al., "Fast location of similar code fragments using semantic 'juice,'" SIGPLAN Program Protection and Reverse Engineering Workshop, page 5. ACM, 2013. Details of BinJuice are provided below.

Abstraction of semantics of blocks of a binary is termed as "juice." Whereas the denotational semantics summarize the computation performed by a block, its juice presents a template of the relationships established by the block. BinJuice is a tool for extracting the "juice" of a binary. It symbolically interprets individual blocks of a binary to extract their semantics: the effect of the block on the program state. The semantics are generalized to juice by replacing register names and literal constants by typed, logical variables. The juice also maintains algebraic constraints between the numeric variables. Thus, this juice forms a semantic template that is expected to be identical regardless of code variations due to register renaming, memory address allocation, and constant replacement. The terms in juice can be canonically ordered using a linear order presented. Thus semantically equivalent (rather, similar) code fragments can be identified by simple structural comparison of their juice, or by comparing their hashes. While BinJuice cannot find all equivalent constructs, for that would solve the Halting Problem, it does significantly improve the state-of-the-art in both the computational complexity as well as the set of equivalences it can establish. Results have shown that juice is effective in pairing code variants created by post-compile obfuscating transformations.

Introduction. There is a growing need for the comparison of binary executables in applications such as binary patching, malware analysis and copyright infringement investigation. In these applications, it is important that the comparison algorithm account for changes due to code evolution, changes in compiler optimizations, and post-compile obfuscations. Furthermore, while binary patching typically requires comparing a pair of binaries known to be successive versions of the same software, the other applications require searching for matches to a given binary within a large collection of binaries. For malware analysis in particular, this collection may be extremely large, consisting of hundreds of thousands, if not millions, of malware.

This section of the present disclosure introduces a notion of "juice," a generalization of the denotational semantics of a program. The juice captures the essential relations established by a piece of code, independent of choices of registers and literal constants. The juice then serves as a template of the code that is invariant against certain choices made by compilers or by code obfuscation tools. FIG. 9 shows a table 900 that presents an example of binary code, its semantics, and its juice. The first column presents the hex dump of an executable code fragment along with its disassembled code, the second column contains the (denotational) semantics of the code fragment, and the third column shows its juice. The semantics give the result of executing the code fragment as a function of the state before execution. This state is given by the function 'def' (for default). Thus, def(ebx) represents the content of the 32-bit register ebx at the entry of the code fragment. The semantics indicates that upon execution of the code fragment, the register eax will contain the value 5 and the register ebx will contain the result of multiplying def (ebx) by 5 and adding 20. The presented semantics also contains the steps in computing the value of ebx. It is assumed that the state of all other register and memory locations remain unchanged. For simplicity the effect on the flag registers is not presented. The juice is computed by replacing in the semantics the register names and literal constants with typed variables and introducing algebraic constraints. In the presented juice, the symbols N1, N2, and N3 are assumed to be of numeric type and the other symbols are 32-bit registers. The juice shows that the register variable A will contain number N1 and register variable B will contain the number computed by multiplying the previous value of B by number N1 and adding number N2. Further, numbers N1 and N2 are related using a third number N3 such that number N2 is equal to number N1 multiplied by number N3. In other words, number N3 is a multiple of number N1.

As illustrated by the above example, the juice of a code fragment is an abstraction of its semantics, which in turn is an abstraction of code. In the above example, the semantics in the second column may be used to represent all code fragments that result in eax containing the value 5 and ebx containing the value def(ebx)×5+20, leaving all other registers and memory unchanged.

The juice, on the other hand, represents all code fragments whose semantics can be abstracted as the given algebraic and type constraints. In the above example, the juice represents all code fragments that result in one 32-bit register (A) containing some specific number (N1) and the value in a second 32-bit register (B) being multiplied by the previous value (N1) and summed with a second number (N2), where N2 is a multiple of N1. Juice may be computed at varying levels of abstractions. For instance, at the lowest level, one may abstract the register names, but not the literal constants. Such an abstraction may be used to relate code fragments that have the same semantics, modulo register names. On the other end, the literal constants may be generalized but the algebraic and register size constraints may be ignored, thus significantly expanding the code fragments that may be placed in an equivalence class. Consider the juice resulting from ignoring the register size and algebraic constraints in the example of table 900 in FIG. 9.

The resulting juice will relate all code fragments with the semantics that one register, A, of any size contains some number, say N1, and a second register, B, contains the def(B)×N1+N2, where N2 is some number (with no explicit relation to N1). A system, BinJuice, is implemented that computes the semantics and the juice of individual blocks of instructions, where a block is defined in the classical sense. The juice of a block consists of three components: the generalized semantics, the generalized algebraic constraints, and the type constraints. Depending on the need of the application, one may use the code (from the original program), the semantics, or the juice at any of the varying levels of abstractions.

BinJuice can provide an important building block for various applications requiring comparison of binaries. At the core level, Bin-Juice abstracts a given binary to its semantics and its juice. A given pair of binaries can then be compared by matching the semantics, the juice, or both. BinJuice provides the primitives for finding differences in two related binaries as that performed by BinDiff or BinHunt. On the other hand, the juice extracted by BinJuice may be used to create features for data mining tools, such as Bit-Shred, BigGrep, or Vilo, to aid applications that require searching a large collection of binaries for matches.

Method: The general BinJuice method of extracting a binary's juice consists of the following steps 1-4: (1) Disassembling the binary; (2) Decomposing the disassembled program into procedures and blocks; (3) Computing the semantics of a block; and (4) Computing the juice of a block.

The first two steps are routine, and may be performed by many tools, such as IDA Pro and objdump or the like. The quality of the computed semantics and the extracted juice depends on the quality of the results of these two steps. Since both disassembly and procedure boundary detection are undecidable problems, any solution is necessarily an approximation. The disassembly produced by the aforementioned tools (and others) neither guarantee sound (over approximate) nor complete (under approximate) solutions. Hence the soundness or completeness properties of semantics and juice computations discussed in this paper are predicated upon precise solutions to the first two steps.

A procedure resulting from step 2 is assumed to be represented as a control flow graph (CFG). A node of this graph is a block: a sequence of instructions such that if execution starts at the first instruction, the control will fall through to the last instruction, subject to termination. The semantics and juice is computed for individual blocks. The semantics (or juice) of a procedure is then represented as a semantic (or juice) graph that is isomorphic in structure to the CFG and whose nodes represent the semantics (or juice) of the corresponding node in the CFG.

The crux of the algorithm lies in the computation of semantics and extraction of juice of an individual block. These are described below.

Computing Semantics: A code fragment is mapped to its semantics through symbolic interpretation. The operation encoded by an assembly instruction, such as ADD, is performed on symbolic values. Whenever the operand values are known to be of type Int, the computation is performed immediately by the interpreter, thus resulting in a specific value. However, when one or both operands of a binary operator are not Int, then the operation is frozen as a structure r1 op r2. Unary operators are also treated similarly. The symbolic interpreter has the following function signature:

Interpret: seq(Instruction)×State→State
where State=LValue→RValue

The semantics of a program denotes its effect on the store, which is represented as semantic domain State defined inductively as follows:
State=LValue→RValue
LValue=Register+Mem
Mem=RValue→RValue
RValue=Int+def(LValue)+(RValue opRValue)+(opRValue)

The set Register represents the set of general purpose registers, such as, eax, ebx, etc., as well as flags, such as, zf, cf, of, etc. The set Mem represents memory. An element of this set maps a RValue to RValue. The set Int represents the set of numbers. The operator 'def', an element of State, represents the previous state (being updated). The term 'r1 op r2', where r1, r2∈RValue, are symbolic expressions, and 'op' is a binary operator, such as, '+', '−', etc. Similarly, 'op r1', where r1∈RValue represents a unary operator.

Along with symbolic interpretation, one may also assume a function that performs algebraic simplification of an RValue:

Simplify:RValue→RValue

The function Simplify uses the associative, commutative, and distributive properties of operations to transform a symbolic expression to sum-of-product form [11, Chapter 12]. The commutative and associative properties are used to reorder operands of an expression into a canonical form. For instance, the expressions: (def(eax)+2)+def(ebx); (def(eax)+def(ebx))+2; and (2+def(ebx))+def(eax) are all transformed to 2+(def(eax)+def(ebx)).

The distributive property is used to refactor an expression so as to propagate operations of higher precedence deeper within the expression. Thus, the expression (def(eax)+2)×def(eax) is transformed to (def(eax)×def(eax))+(2×def(eax)). The algebraic simplifier also includes rules of identities and zeroes of various arithmetic and logical operators. These identities and zeroes are also used to simplify expressions, such as reducing an expression of the form (def(eax)−def(eax))×def(ebx) to the integer 0.

In addition, a linear order over RValue is used to map commutative operations to canonical form. Akin to ordering of ground terms in Prolog, the ordering is defined by using the names and arity of functions to order terms. A function with smaller arity is smaller than one with larger arity. Two functions of the same arity are ordered using lexicographic ordering of their function names. Numeric values are ordered using numeric order and are considered smaller than functions and symbols.

The semantics of a code segment 'c' is the state 's' resulting from the mapping Interpret(c, def)=s. In the table 900 of FIG. 9, the semantics is presented as 'updates' to def. The expression 'eax=5' means that upon execution of that block of code, register eax will contain the value 5. Using the linear order over RValue, which is also extended to LValue, a State can be represented as an ordered sequence of pairs of LValue and RValue. With the sorted representation, the semantics of two code segments can be compared in linear time with respect to the sizes of their states, or can be tested for equality in constant time using their hashes.

An algebraic simplifier's ability to map equivalent code to the same semantic structure depends on, among other things, whether the rewrite rules used by Simplify are confluent. Completing a set of rewrite rules to make the set confluent is an undecidable problem. Thus, the simplifier does not in any way bypass undecidability. In spite of its limitation, however, a simplifier based on (known) algebraic equalities can normalize a large set of expressions, so as to be useful on real-world code.

Extracting Juice: The purpose of extracting juice is motivated by the desire to efficiently determine whether two code segments are semantically equivalent modulo renaming of registers. Previous works have addressed this challenge by generating all possible permutations of renamed code segments and comparing their semantics. While such a method is safe, it is computationally expensive and does not scale for the problem of searching for semantically similar code in a large collection of malware. On the other hand, the semantics of blocks can directly be used to create a scalable search algorithm, but such an algorithm will not account for register renaming, and hence be too strict.

As stated earlier, juice is a generalization of semantics along with type and algebraic constraints. Whereas semantics consists of ground terms, juice terms may contain logical variables. The generalization of semantics to juice may be performed by consistently replacing register names with logical variables. The replacement is consistent in that two occurrences of the same register name are always replaced by the same variable. In addition to abstracting the registers used, one may also abstract the literal constants. In the example of table 900 of FIG. 9, the semantics 'ebx=def(ebx)×5+20' generalizes to 'B=def(B)×N1+N2' by consistently renaming its registers and literal constants. The type of the variables introduced follows directly from the type of the term they replace. Since the logical variable B replaces the 32-bit register eax, it follows that B is of type reg32. Similarly, it follows that N1 and N2 are of type Int.

The problem then remains how does one generate the algebraic constraints between the logical variables, for instance, the constraint 'N2=N1×N3' in Table 1. An innovative approach is presented here for generating such algebraic constraints. The key idea is to augment the symbolic interpreter to track the simplifications it performs. In the previously-given example, the term 20 in the expression 'def(ebx)×5+20' results from the immediate simplification of the expression 5×4, which in turn follows from the distributive property of multiplication. In this example, the interpreter will annotate the semantics with the tautology '20=5×4'. Then, when extracting juice, the annotations are also generalized along with the semantics. Thus, the term 20 is replaced by N2 and 5 by N1 in both the annotation and the semantics, yielding the constraint 'N2=N1×N3'.

Having computed the juice for code fragments, the question still remains: how does one efficiently determine whether two fragments have the same juice? As done for semantics, it would be ideal if equivalent terms can be mapped to a canonical form. However, the existence of logical variables in juice terms poses a challenge. One possibility is to name these variables in the order in which substitutions are performed, and use the resulting order for comparison. Then the juice terms can be ordered using this linear order. When two such ordered juice terms match, the corresponding code fragments will be equivalent, modulo renaming of variables and literal constants. However, it is also possible that a different ordering of variables may lead some other pairs of terms to match, and thus correctly identify other sets of equivalent code fragments. Thus, even though an arbitrary order imposed on logical variables will correctly identify equivalent code fragments, it may also miss some equivalences.

Since an arbitrary order on logical variable is not satisfactory, it may be preferable to treat variables as unordered. This leads to a partial order on juice in which two equations in the juice of a code segment cannot be ordered linearly if and only if they are variants of each other, i.e., they are identical except for their variables. FIG. 10 depicts a table 1000 that presents an example to illustrate this. The first two columns of the table contain the semantics of two code fragments. It is evident that the semantics are equivalent, except for the choice of registers. The semantics in column (a) can be transformed to that in column (b) by replacing the register eax by ecx. The two semantics naturally result in juice that differs only in the logical variables. One such juice is given in column (c). Whereas the terms in the semantics could be linearly ordered, the same is not true of the juice. The two terms 'R1=N1' and 'R2=N2' cannot be ordered. The same is true of the other two terms.

FIG. 10, column (d), shows another abstraction of juice that trades safety for an increase in the set of code fragments that may be deemed equivalent. This abstraction takes advantage of the observation mentioned above that only mutually variant terms in juice cannot be ordered. In this abstraction, the variant terms in the juice are unified, yielding a structure that is linearly ordered. As is evident from the example, such a generalization may result in a significant loss and may not always be prudent.

Preliminary Results: The described BinJuice system can implement the described BinJuice method. Preferably, the symbolic interpreter and simplification algorithm of BinJuice are written in SWItProlog and its frontend in Python. The system takes as input disassembled code, such as that produced by objdump or the like. The Python frontend parses the disassembly (disassembled code), partitions it into procedures, constructs their CFGs, and then feeds each block of code to the Prolog backend over a http connection. The Prolog backend computes each block's semantics and extracts its juice. The juice consists of four components: the generalized semantics, the type constraints, the algebraic constraints, and the generalized code fragment. The generalized code fragment is produced by generalizing the original code using the same variable substitutions as those used for the generalized semantics.

The efficacy of BinJuice's semantics computation and juice extraction capabilities have been studied using two sets of data: (1) variants of Win32.Evol, a metamorphic virus, and (2) ten versions each of two benign programs downloaded from Github. The first set of programs represent variants that may be generated by post-compile obfuscation transformation and the second set represents versions resulting from normal code evolution.

The purpose of the first study (with Win32.Evol) was to determine whether BinJuice can aid in locating matching code blocks in automatically generated variants. The purpose of the second study was to determine whether use of juice improved upon the similarity computation as compared with using semantics or n-perms.

The Win32.Evol variants were acquired from a previous study. In that study, the malware was used to infect eight Microsoft Windows 'goat' executables. The infected executables were then run again to reinfect the goat files. Since the malware is metamorphic, at each infection it introduces a modified copy of its code and creates a new variant. Some goat files were reinfected up to six times, creating up to six 'generations' of infection.

FIG. 11 depicts a table 1100 giving an example of semantic juice extraction for code transformed using the metamorphic engine of Win32.Evol. The code segments in columns (a) and (b) are for corresponding blocks of the two variants of the malware and are semantically equivalent. Column (c) shows their (identical) extracted semantics, and it also shows the tautologies used in algebraic simplification for Variant 1. The example is indicative of what was found for all the variants of Win32.Evol. The semantics can be used to identify corresponding blocks of code for variants even though the code for the blocks may be transformed. Column (d) shows the corresponding juice along with the algebraic constraints.

Experience with Win32.Evol showed that the semantics and juice computed by BinJuice can be used to accurately pair corresponding blocks so long as they were transformed by equivalence preserving transformations. Win32.Evol contains transformations that, while preserving the semantics of the overall program, do not preserve the semantics of a block. For instance, it has transformations that introduce computations on registers that are known to be dead at the end of the block. In such a situation, the intersection of the semantics (juice) of the corresponding blocks always yields the correct semantics (juice), though the two semantics (juice) are not structurally equal.

In the second experiment, ten versions of tinyrb and mcmap programs were downloaded from GitHub. Tinyrb is a "tiny and fast subset of Ruby Virtual Machine" and mcmap is "a tiny map visualizer for Minecraft." The sources were compiled using gcc and generated x86, 32-bit binaries. These were then stripped and used to extract the following features: n-perms, semantic hashes, and juice hashes. These features were then used in the MAAGI system to construct lineage—the evolutionary relationships between the versions.

Test results showed that the use of semantics or juice did not significantly improve upon the lineage computed using n-perms. Though the results were not exciting, they are also not conclusive. Since the same version of the compiler was used with the same optimization levels, the unchanged functions between two successive versions had exactly the same code. Thus, the similarity computed using n-perms was just as good as that using semantics or juice.

Taken together the results of the two preliminary studies indicate that the semantics and juice computed using BinJuice would be effective in finding similar code fragments in a repository of malware where post-compile obfuscators are used to generate variants. However, for a repository of benign programs, the lower cost features generated using n-perms or n-grams may be sufficient.

Potential limitations: as any method for finding semantically similar code fragments may be limited by Rice's Theorem, this implies that no computer program can precisely identify equivalent (or similar) code fragments between all pairs of programs. Yet, it may still be instructive to identify obvious limitations that may influence the results in practical real-world programs. These limitations can also identify weaknesses a malware author may exploit to defeat a system employing the method presented.

One significant limitation of a BinJuice implementation may be that the BinJuice method is centered around semantics of basic blocks. As a result semantically equivalent programs that differ in how computation is spread across the basic blocks would not have similar block semantics or juice. Such differences in content and structure of blocks may arise due to differences in compilers and optimization levels. The differences may also be explicitly forced by post-compile obfuscators.

The block-centric limitation may be overcome by computing the semantics for single-entry, single-exit subgraphs. The benefit comes at a cost, since the number of such subgraphs is quadratic on the number of blocks. Another alternative may be to use semantics of n nodes along a path in the CFG, akin to n-grams. Though this may counter some optimizations and obfuscations, it is sensitive to even very small changes in semantics due to small evolutionary changes or due to dead code insertion by obfuscators. As a result, one may need to use inexact matches on semantics or juice, thereby making the operation expensive.

As with data flow analysis, aliases can bring a new set of challenges. Two code segments may be equivalent under aliasing, for instance, when two registers hold the address for the same memory location. Determining such equivalences may require the need of theorem provers, and may not be amenable to simple structural comparisons. However, the use of such equivalences may also produce false matches, causing segments of code to be considered equivalent under aliasing even though such aliasing may not arise in the program.

Conclusions: BinJuice introduces two improvements to prior works on the use of symbolic interpretation to find similar code fragments. First, it canonicalizes the terms representing the semantics using algebraic simplification such that equivalence can be determined using structural equality. This offers a very fast method for comparing the semantics of code blocks, albeit subject to the limitations of the algebraic simplifier. Second, it introduces a novel concept: juice—a generalization of the semantics. Juice is computed by replacing register names and literal constants in the semantics by typed variables. More importantly, juice also maintains algebraic constraints relating those variables. Thus, juice serves as a template of the semantics and may be used to match code fragments that differ due to register renaming and also choice of constants.

This work is motivated by the need to find similar code fragments in a large repository of binaries, an application in which a fast method to match semantics (or any abstraction) is a prerequisite. Unlike semantic terms, juice terms cannot be linearly ordered and thus cannot be compared using their hashes. Further abstraction of the juice is presented so as to impose a linear order, thereby enabling fast comparison. The abstraction comes at a loss of accuracy whose effect on real-world applications needs to be determined empirically.

Further Exemplary Embodiments

Clause 1. A system for predictive malware defense, the system including: a processor; a memory in communication with the processor via a communication infrastructure and storing instructions that, when executed by the processor, cause the processor to: perform feature reduction training on a collection of events including benign and malicious events, producing a feature reducer; perform evolution pattern training, wherein a collection of malicious events has features extracted which are converted into signatures by the feature reducer, and wherein a family clusterer produces a collection of families from the signatures, producing an evolution pattern predictor operative to predict future signatures in a family; perform evolution pattern prediction, wherein a collection of malicious events has its features extracted, which are converted into signatures by the feature reducer, wherein the family clusterer produces a collection of families from the signatures, and wherein the evolution pattern predictor operates on the collection of families to produce future malicious event signatures; perform malicious event detection training, wherein a collection of benign and malicious events, with known labels, has its features extracted, which are converted into signatures by the feature reducer, wherein the signatures are combined with the future malicious event signatures, creating a training collection for an event classification trainer, wherein the event classification trainer learns a model to distinguish between training instances with benign and malicious labels, resulting in an event classifier that can classify a new event as benign or malicious; and perform event classification on a new set of events, wherein the new set of events has its features extracted, which are then converted into signatures by the feature reducer, and wherein the event classifier takes the signatures and produces a benign or malicious classification for an event within the new set of events.

Clause 2. The system of clause 1, wherein the collection of events includes computer code in a binary executable file format.

Clause 3. The system of clause 1, wherein the feature reducer uses singular value decomposition (SVD) for feature extraction.

Clause 4. The system of clause 1, wherein for feature extraction semantics of a code block of an event are derived from the code of the code block.

Clause 5. The system of clause 1, wherein the family clusterer produces a collection of families from the signatures using a locality-sensitive hashing (LSH) scheme.

Clause 6. The system of clause 5, wherein the LSH scheme comprises a MinHash scheme.

Clause 7. The system of clause 1, wherein a SESAME system is used to implement the event classifier and produce a benign or malicious classification for the event within the new set of events.

Any of the foregoing clauses can be combined in any order or permutation, as will be appreciated.

Thus, embodiments of the present disclosure provide for preemptive defense, predicting the form of potential future cyber-attacks and allowing an effective response to be prepared and employed before those attacks actually happen. In addition to defense preparation, prediction afforded by embodiments of the present disclosure can help with strategic planning and prioritization by focusing effort on the most likely attacks.

The algorithms, methods, and processes that have been discussed herein may be implemented with a specially-configured computer system or systems specifically configured to perform the functions that have been described herein for the component. Each computer system can (and in exemplary embodiments, does) include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may be a desktop computer or a portable computer, such as a laptop computer, a notebook computer, a tablet computer, a PDA, a smartphone, or part of a larger system, such a vehicle, appliance, and/or telephone system. Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices or media, such as one or more hard disk drives, CDs, DVDs, and/or flash memories. The software may be in source code and/or object code and/or executable code format. Associated data may be stored in any type of volatile and/or non-volatile memory. The software may be loaded into a non-transitory memory and executed by one or more processors. The software may be written in any suitable language, e.g., Python, C++, C, C#, Java, Javascript, or any other suitable language.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A system for predictive malware defense, the system comprising:

a processor;

a memory m communication with the processor via a communication infrastructure and storing instructions that, when executed by the processor, cause the processor to:

perform feature reduction training on a collection of events including benign and malicious events, producing a feature reducer;

perform evolution pattern training, wherein a collection of malicious events has features extracted which are converted into signatures by the feature reducer, and wherein a family clusterer produces a collection of families from the signatures, producing an evolution pattern predictor operative to predict future signatures in a family;

perform evolution pattern prediction, wherein a collection of malicious events has its features extracted, which are converted into signatures by the feature reducer, wherein the family clusterer produces a collection of malicious families from the signatures, and wherein the evolution pattern predictor operates on the collection of malicious families to produce future malicious event signatures;

perform malicious event detection training, wherein a collection of benign and malicious events, with known labels, has its features extracted, which are converted into signatures by the feature reducer, wherein the signatures are combined with the future malicious event signatures, creating a training collection for an event classification trainer, wherein the event classification trainer learns a model to distinguish between training instances with benign and malicious labels, resulting in an event classifier that can, based on the future malicious event signatures, classify a new event as benign or malicious; and perform event classification on a new set of events using the event classifier, wherein the new set of events has its features extracted, which are then converted into signatures by the feature reducer, and wherein the event classifier takes the signatures and, based on the future malicious event signatures, produces a benign or malicious classification for an event within the new set of events.

2. The system of claim 1, wherein the collection of events includes computer code in a binary executable file format.

3. The system of claim 1, wherein the feature reducer uses singular value decomposition (SVD) for feature extraction.

4. The system of claim 1, wherein for feature extraction semantics of a code block of an event are derived from the code of the code block.

5. The system of claim 1, wherein the family clusterer produces a collection of families from the signatures using a locality-sensitive hashing (LSH) scheme.

6. The system of claim 5, wherein the LSH scheme comprises a MinHash scheme.

7. The system of claim 1, wherein a SESAME system is used to implement the event classifier and produce a benign or malicious classification for the event within the new set of events.

* * * * *